Nov. 28, 1939.  H. R. SCHEIDEGGER  2,181,682
ELECTRIC LONG-DISTANCE INDICATING SYSTEM
Original Filed Jan. 18, 1929  15 Sheets-Sheet 1
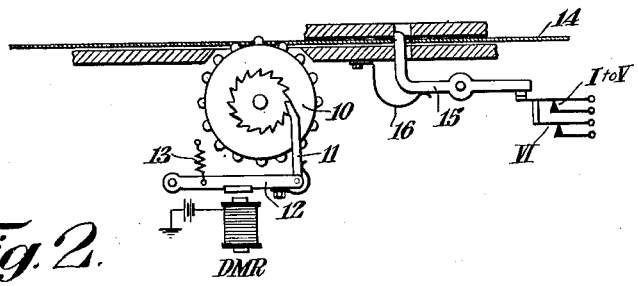
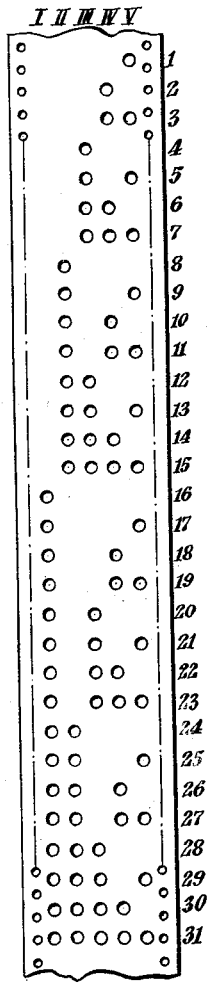
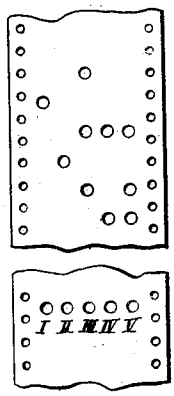
Selection range 4
gap 16
Hundreds 7
Tens 8
Units 5
Fractions 3
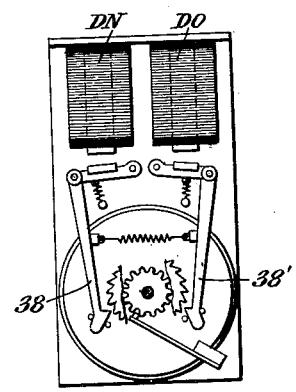
INVENTOR
HANS ROBERT SCHEIDEGGER
BY Ward Crosby & Neal
ATTORNEYS Nov. 28, 1939.    H R. SCHEIDEGGER    2,181,682
ELECTRIC LONG-DISTANCE INDICATING SYSTEM
Original Filed Jan. 18, 1929    15 Sheets-Sheet 4
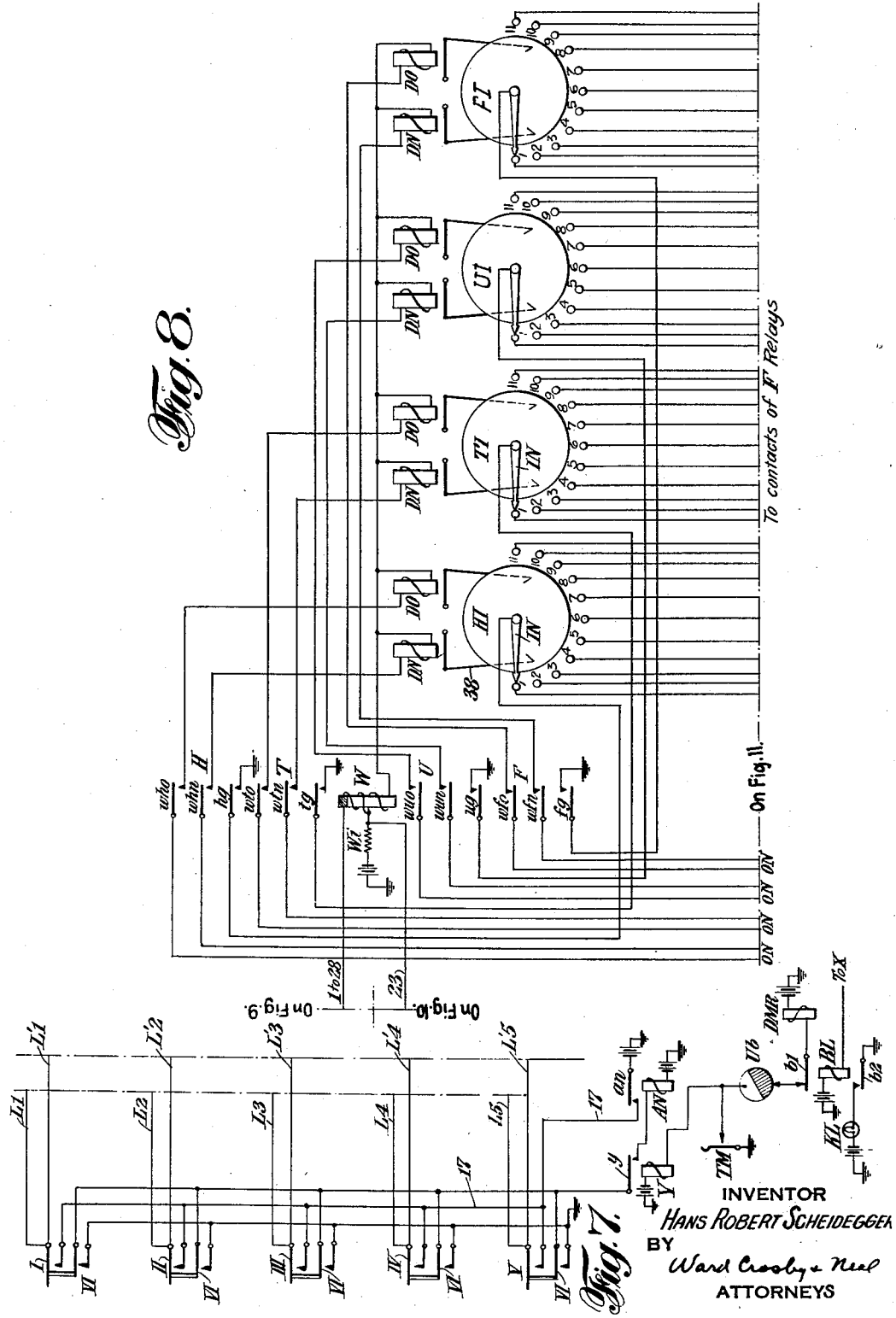
INVENTOR
*Hans Robert Scheidegger*
BY
*Ward Crosby & Neel*
ATTORNEYS

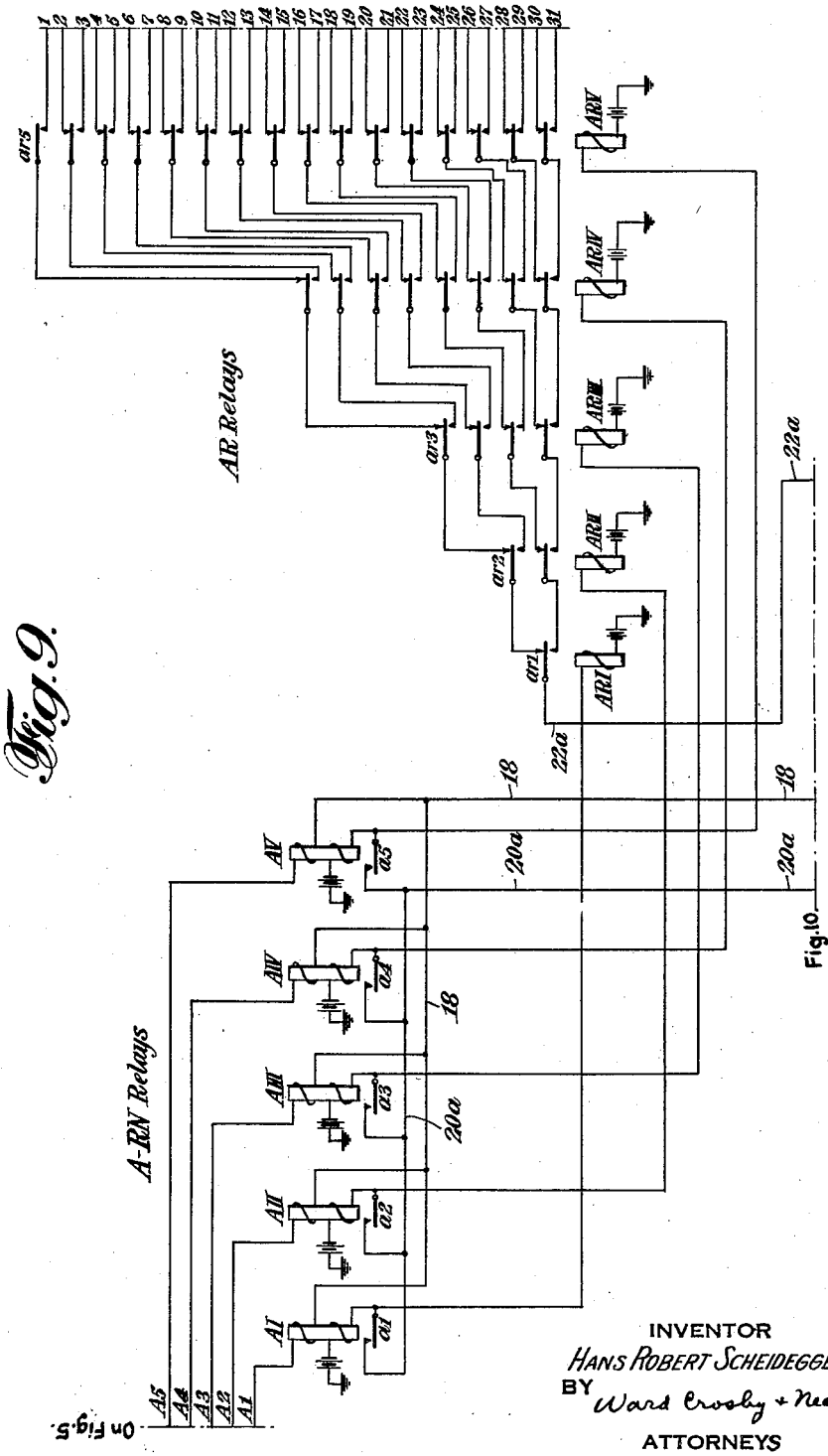

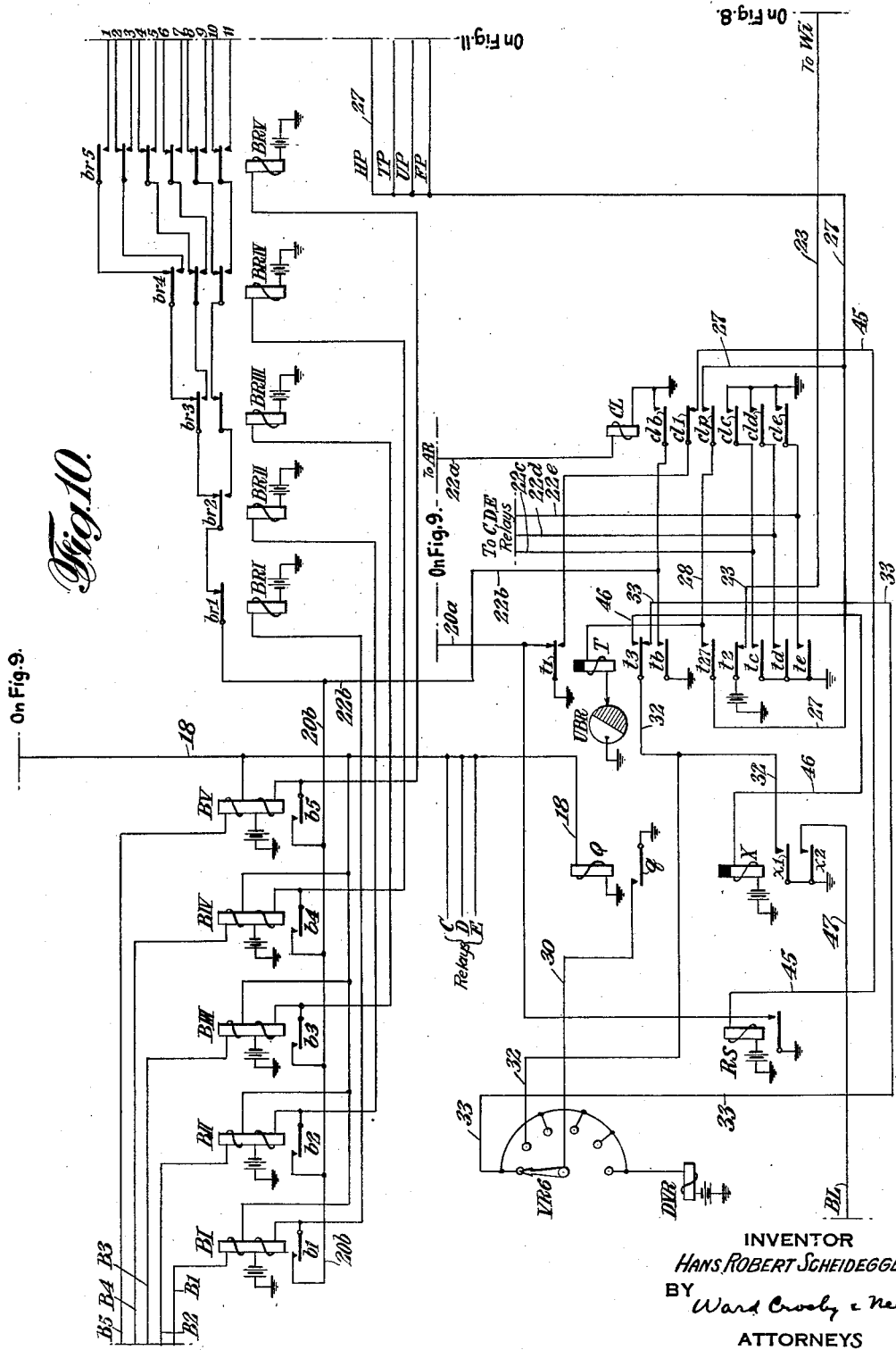

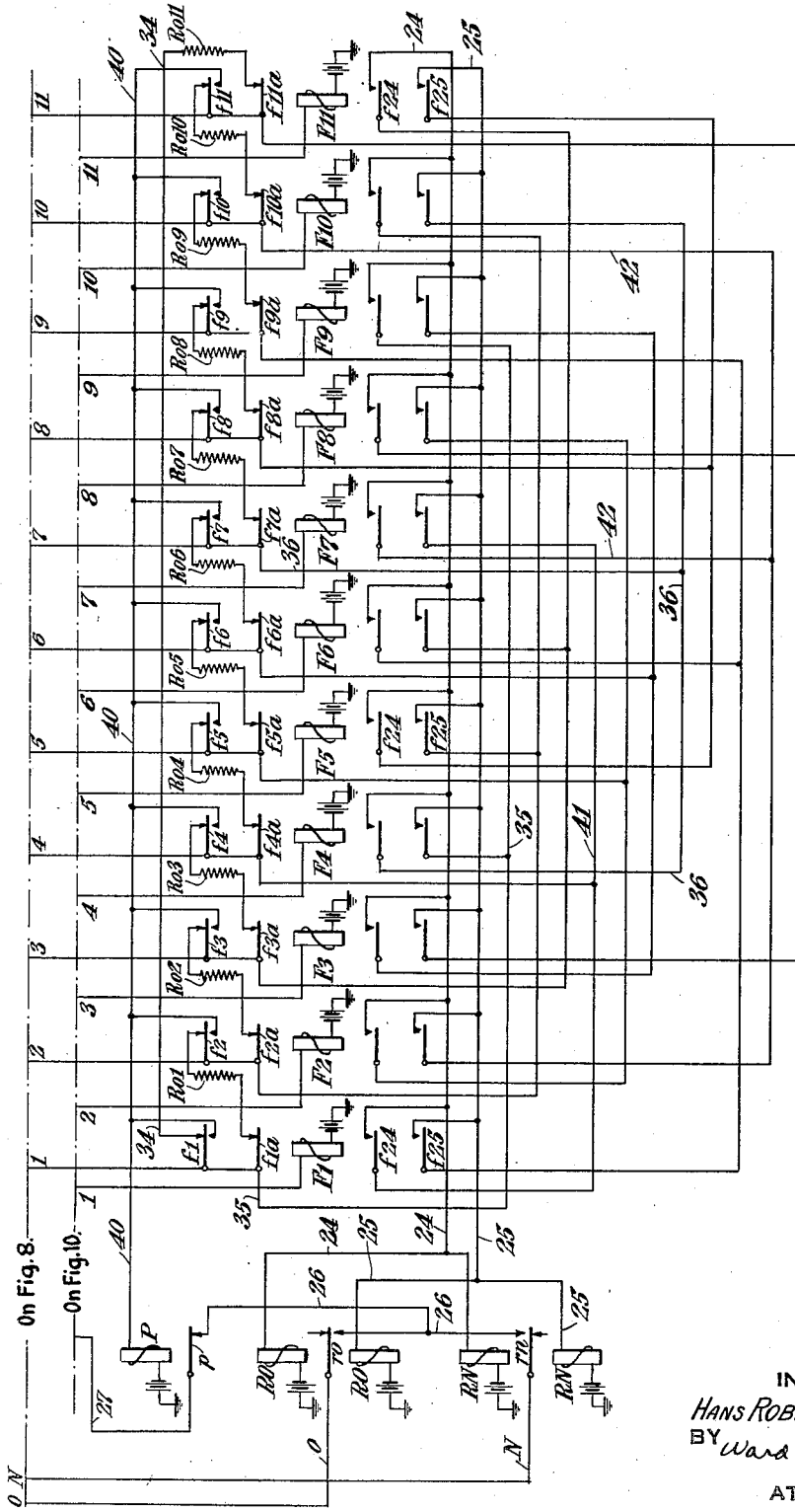

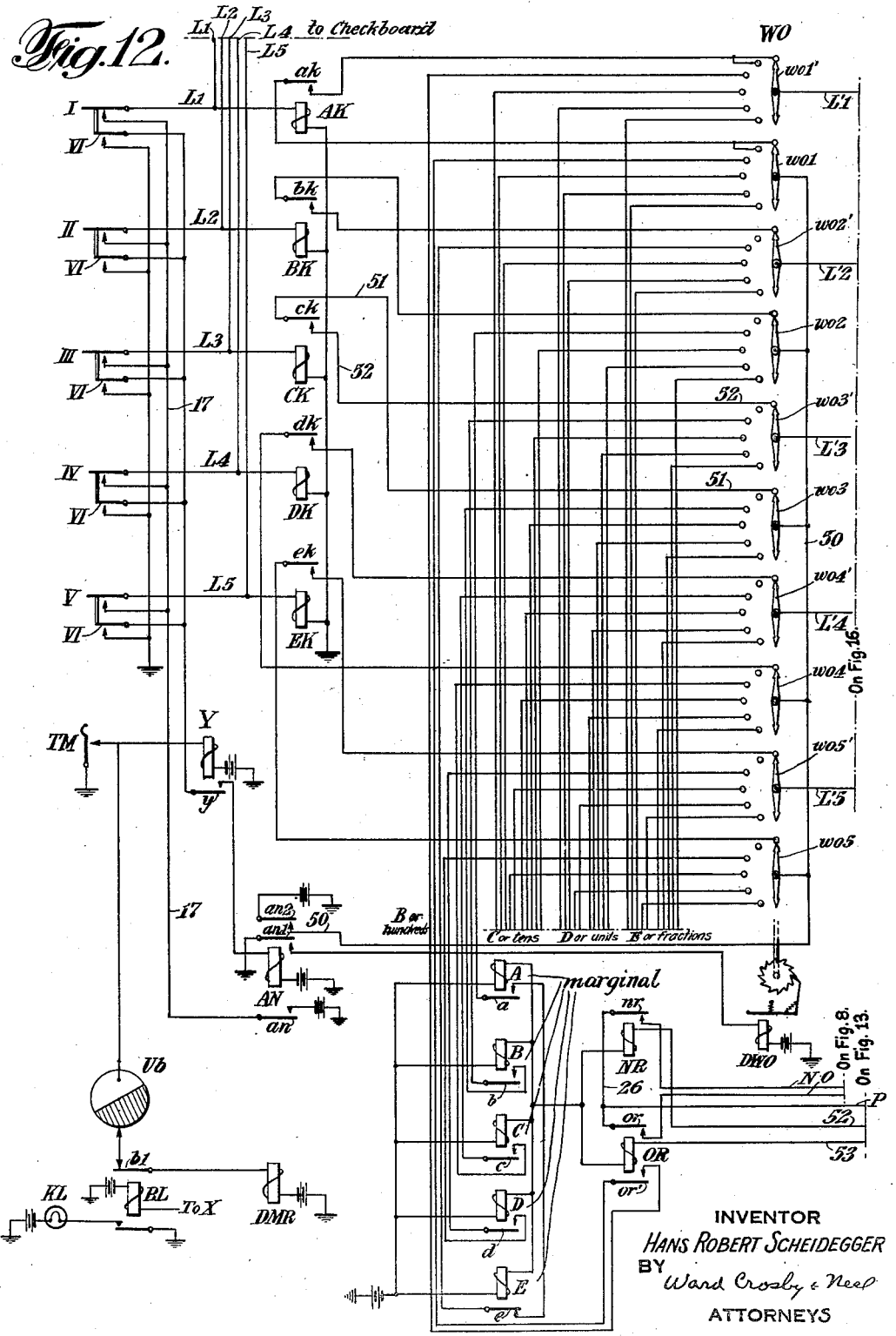

Nov. 28, 1939.  H. R. SCHEIDEGGER  2,181,682
ELECTRIC LONG-DISTANCE INDICATING SYSTEM
Original Filed Jan. 18, 1929    15 Sheets—Sheet 9

INVENTOR
HANS ROBERT SCHEIDEGGER
BY Ward Crosby & Neal
ATTORNEYS

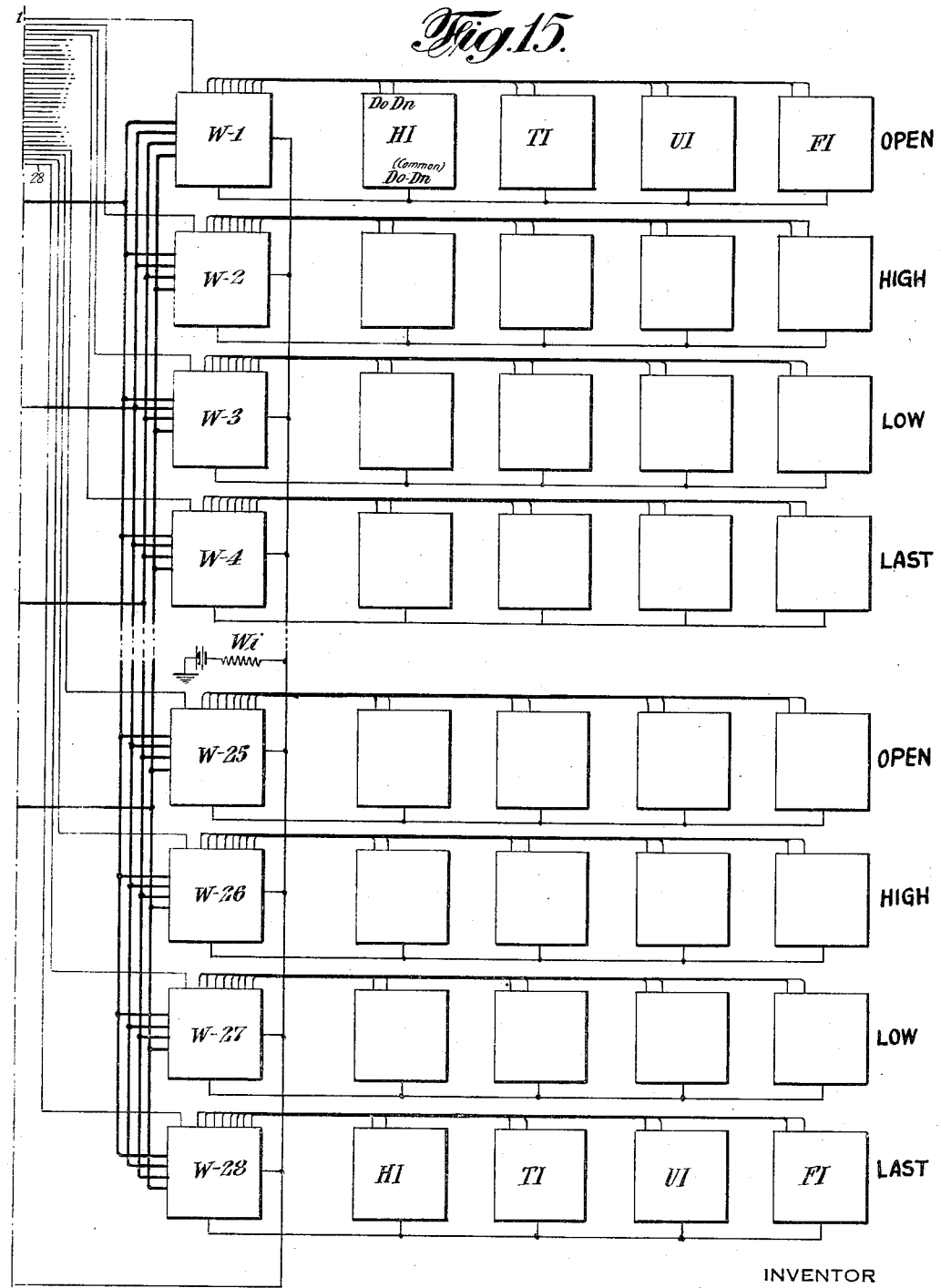

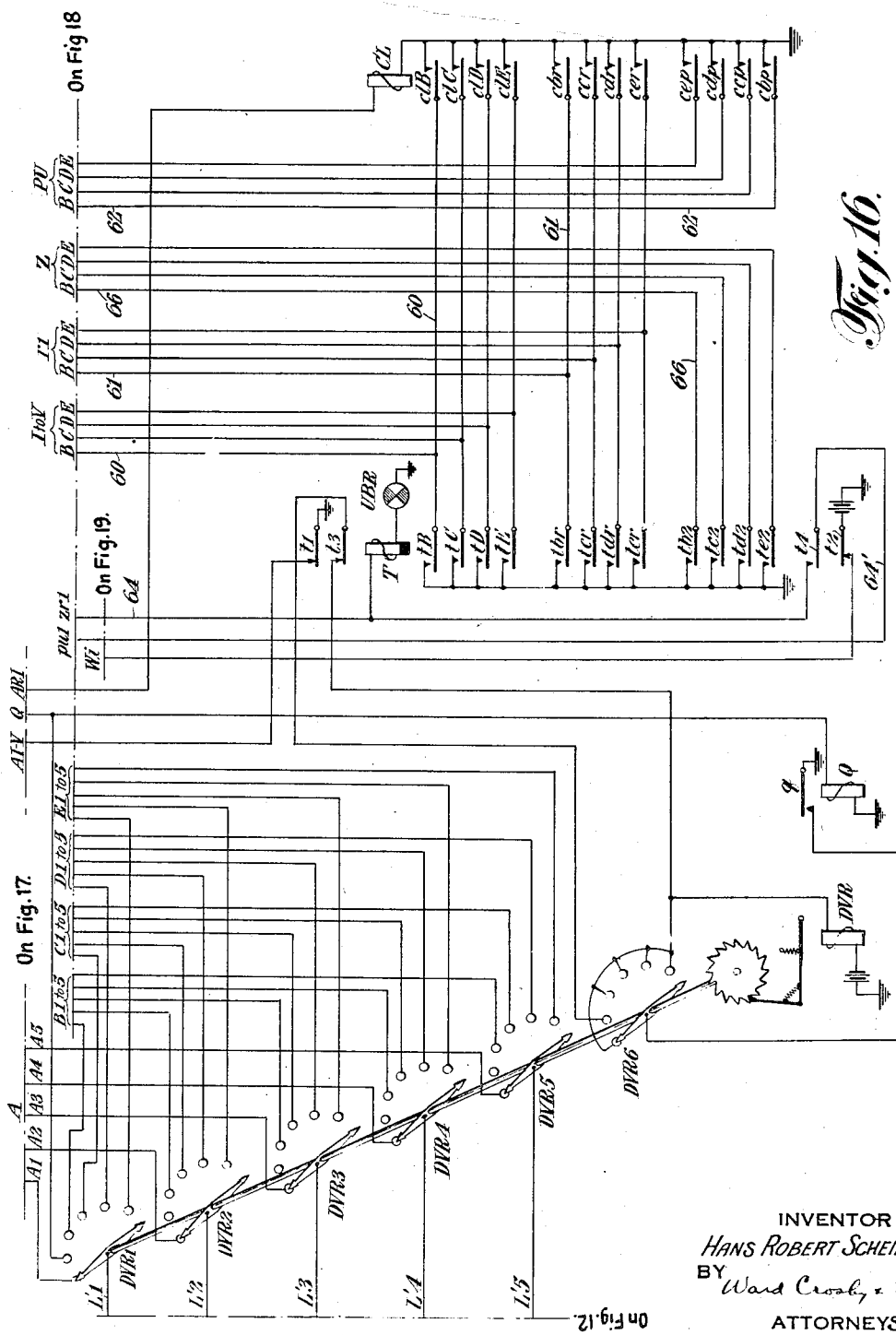

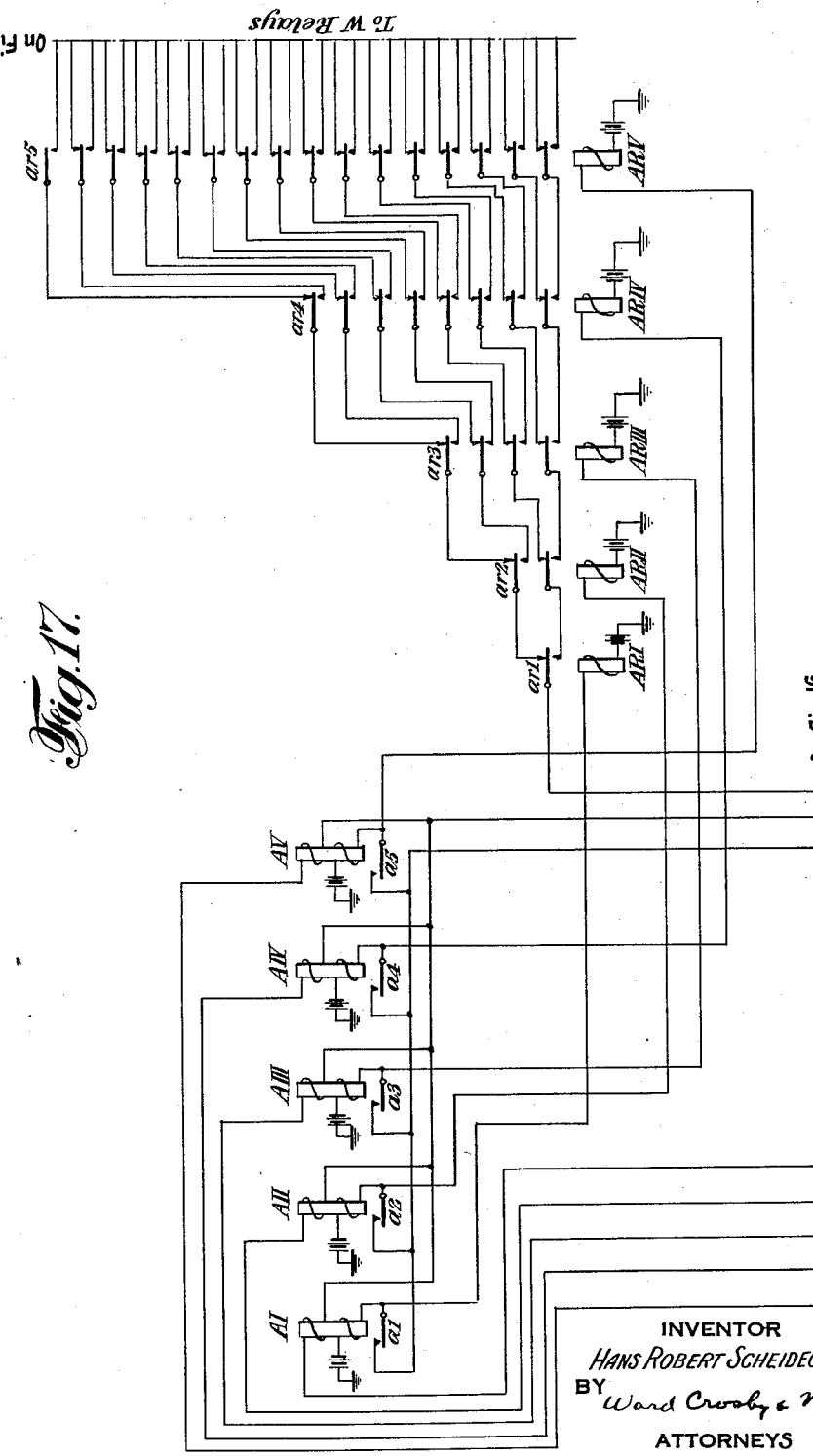

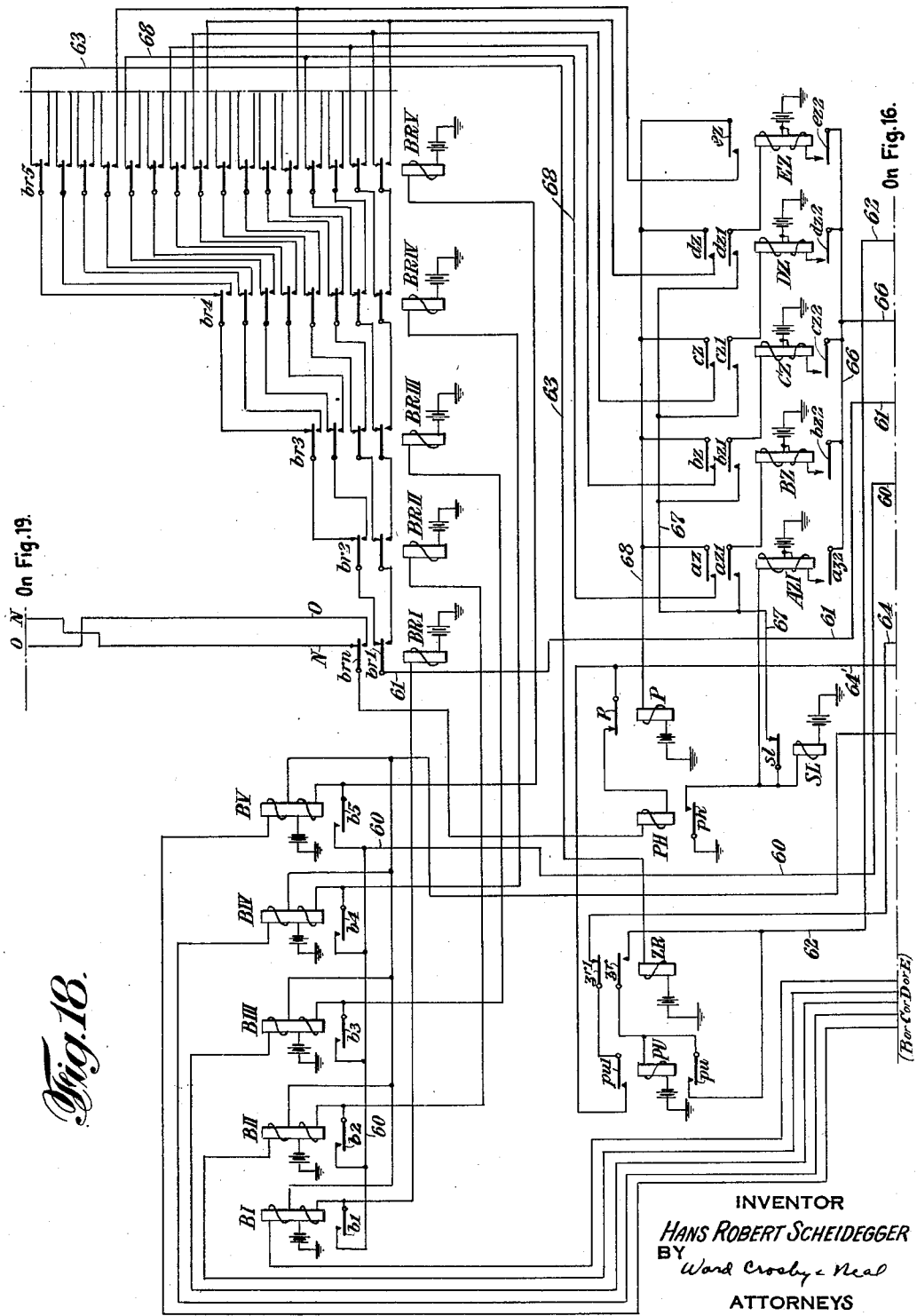

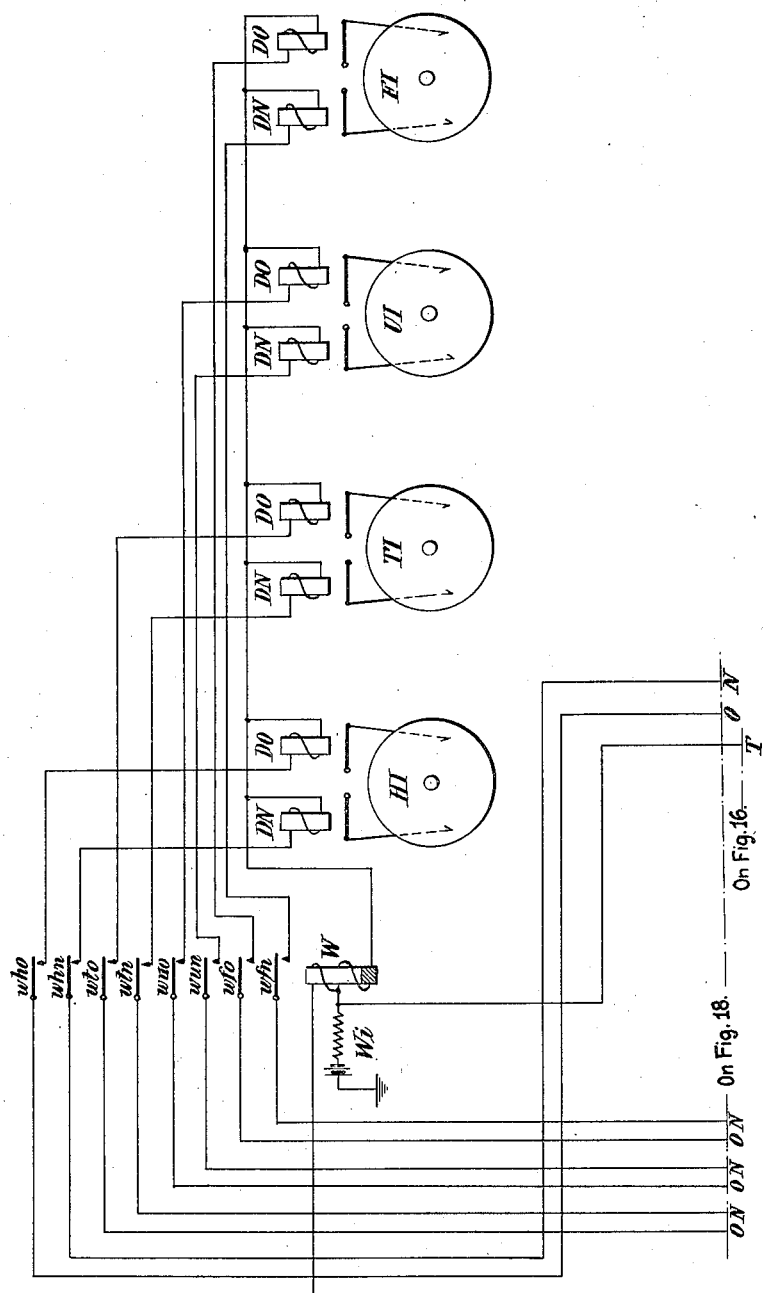

Patented Nov. 28, 1939

2,181,682

UNITED STATES PATENT OFFICE 2,181,682

ELECTRIC LONG-DISTANCE INDICATING SYSTEM

Hans Robert Scheidegger, Berlin, Germany, assignor to The Teleregister Corporation, New York, N. Y., a corporation of Delaware Original application January 18, 1929, Serial No. 333,477, now Patent No. 1,958,208, dated May 8, 1934. Divided and this application September 5, 1930, Serial No. 479,831. In Germany July 21, 1928

20 Claims. (Cl. 177—353)

This invention relates to electric long distance indicating systems of the type disclosed in my application Ser. No. 333,477, filed January 18, 1929, Patent No. 1,958,208 dated May 8, 1934 of which application this is a division.

Among the objects of this invention is the provision of electric long distance indicating systems in which the transmission of stock quotations, or other items of information, may be made at a rapid rate and the new set-up may be effected in the shortest time possible. For the accomplishment of this and other objects mechanism is provided to transmit and receive an impulse or simultaneous impulses to control the selection of the ranges of stock, and an impulse or simultaneous impulses to control the new setting of each of the indicators to the end that complete transmission of selecting and setting-up impulses will require a period of time not longer than the time required for the transmission of a number of impulses equal to 1 plus the number of indicator wheels to be controlled.

The invention may include a check board in the transmitting station which may control the transmission of impulses to distant stations representative of the angle, direction and extent of movement necessary to change from the old set-up to the new set-up. The invention includes mechanism under control of the transmitting mechanism and a check board or quotation board for determining the direction of the shortest movement necessary to effect the new set-up and for moving the indicators in such direction and terminating such movement after the new set-up has been effected.

Other objects of the invention will be apparen from the following description taken in connection with the drawings, in which—

Fig. 1 shows a form of tape transmitting mechanism;

Fig. 2 shows a section of tape perforated to select the various ranges, or to control the setting-up of price digits on the selected indicators;

Fig. 3 shows a section of tape perforated to select a particular range and to set up a particular price;

Fig. 4 shows one of the indicator units;

Figure 5:
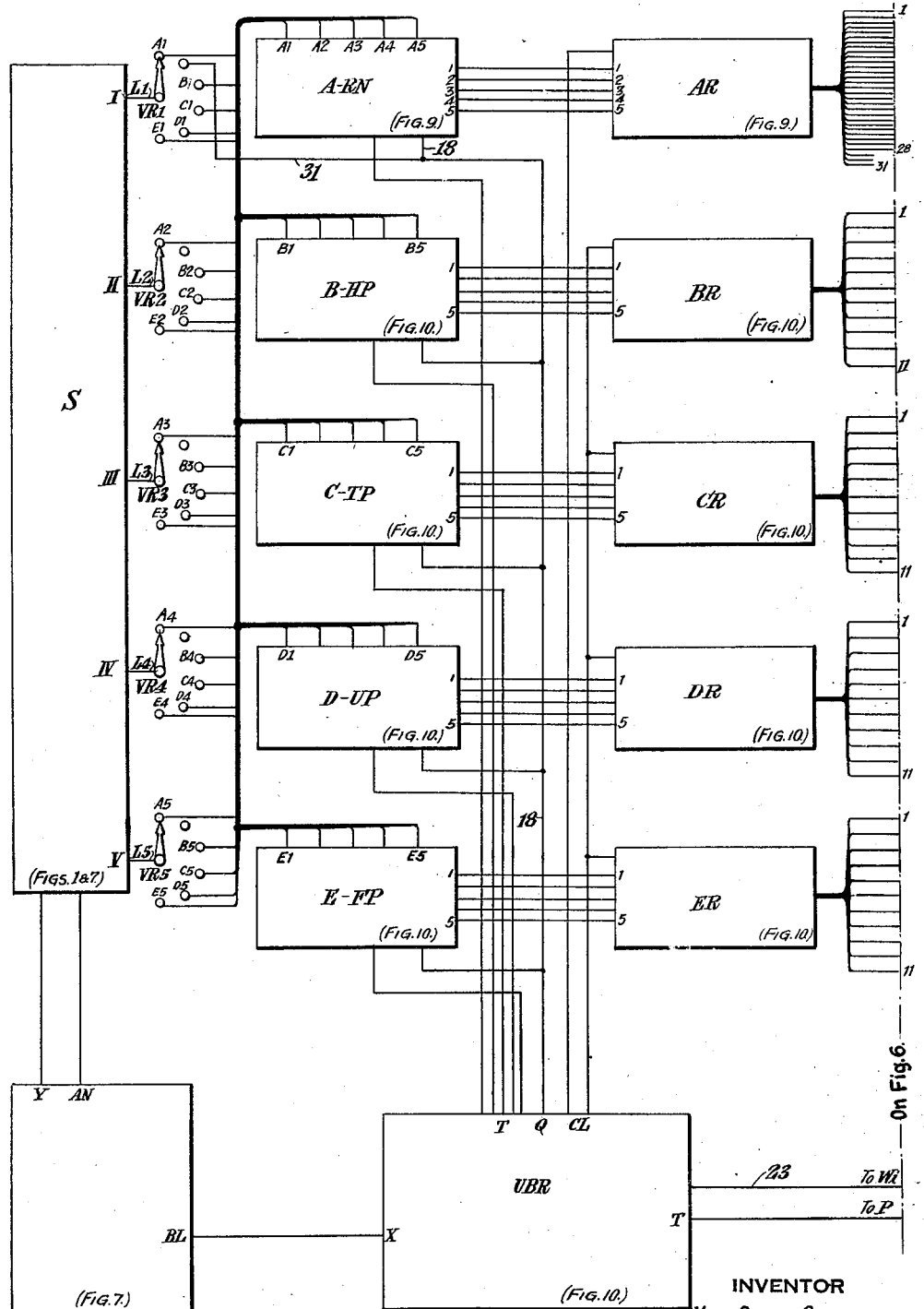
Figure 6:
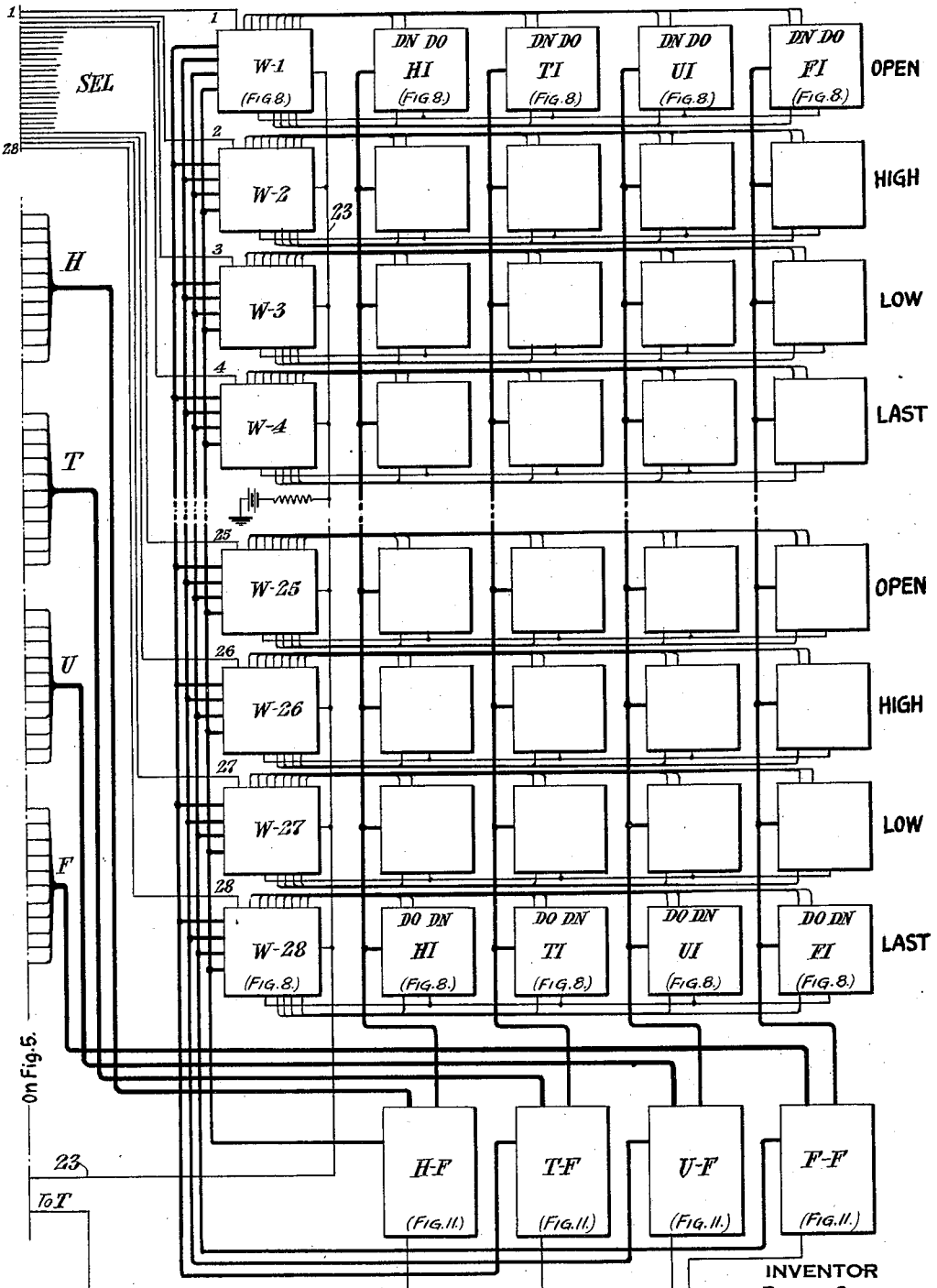
Figure 13:
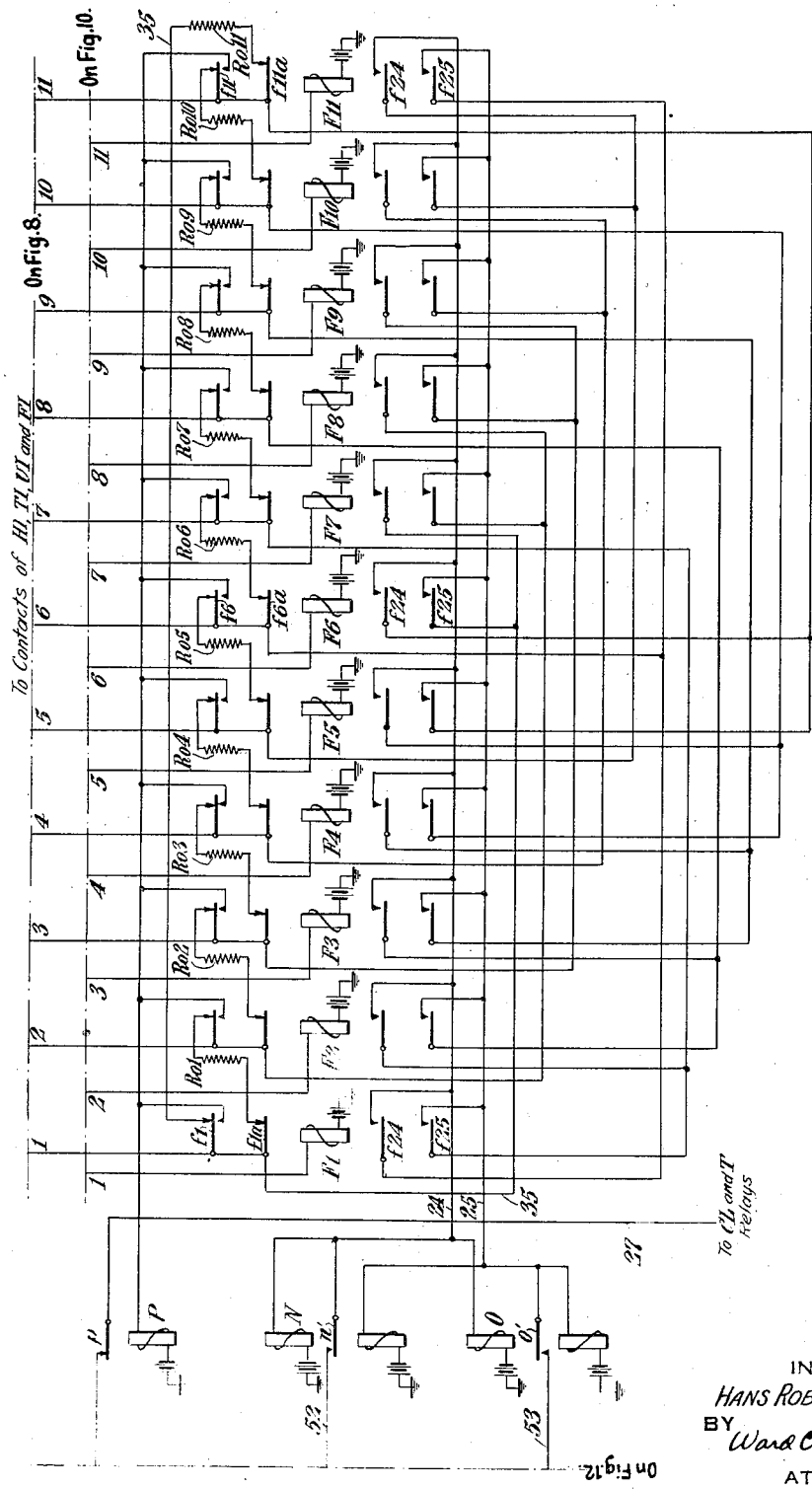
Figure 14:
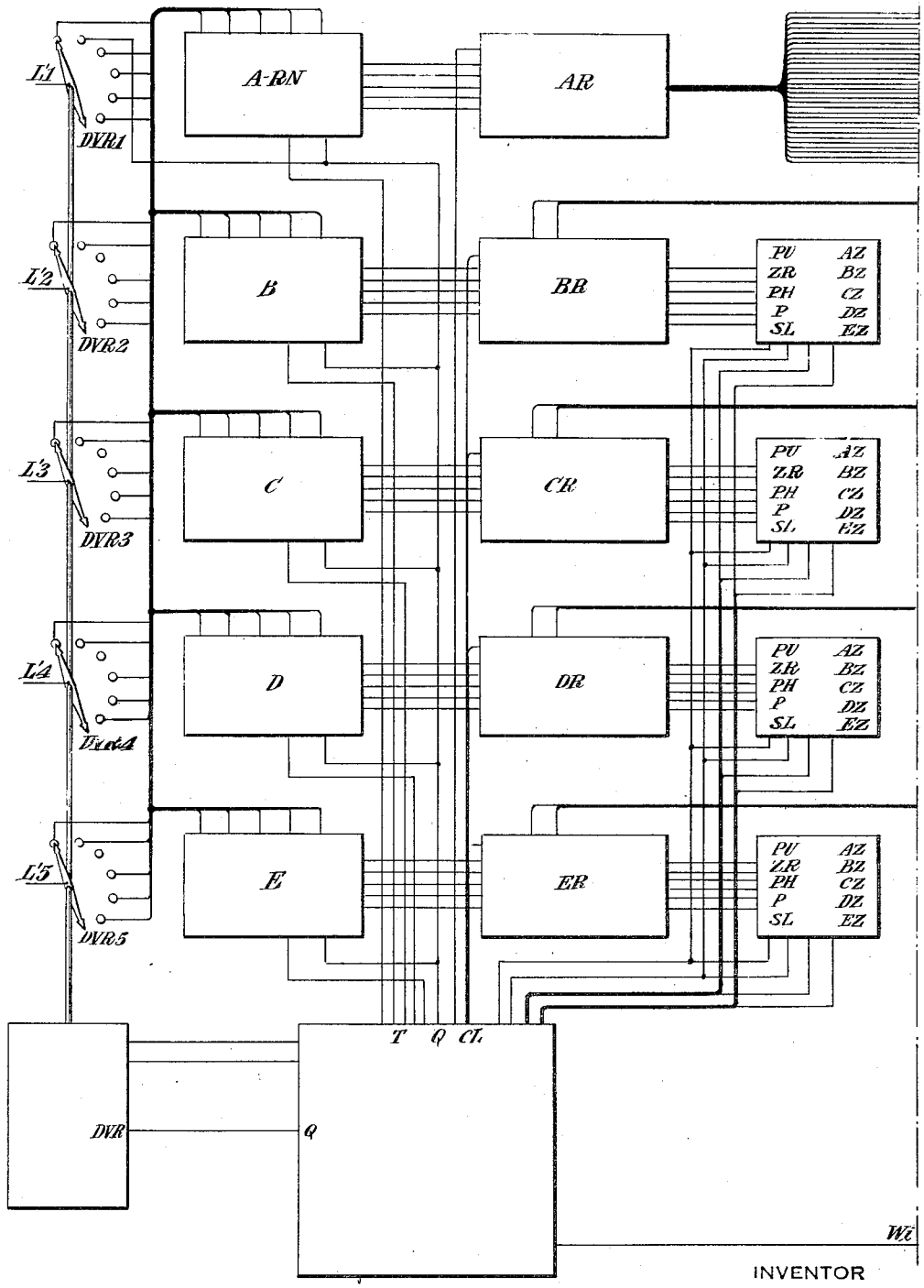

Figs. 5 and 6 taken together show schematically the arrangement of mechanisms in the transmitting and receiving stations;

Fig. 7 shows diagramatically the transmitting contacts;

Fig. 8 shows diagrammatically one range of indicators and a selecting relay;

Fig. 9 shows the selection controlling relays;

Fig. 10 shows the relays for controlling the extent of movement of the various indicator wheels;

Fig. 11 shows a system of balancing relays for controlling the direction and extent of movement of the selected indicator wheels;

Fig. 12 shows a modified form of transmitting mechanism;

Fig. 13 shows a modified form of relays for controlling the transmission to distant stations under the control of the check board;

Figs. 14 and 15 taken together constitute a diagrammatic showing of the wiring system for a distant station;

Fig. 16 shows collector switches in the distant station and the T and CL operation controlling relays;

Fig. 17 shows the indicator selection controllings relays;

Fig. 18 shows the indicator setting controlling relays for the hundreds indicator wheel; and Fig. 19 shows the wiring arrangement for one range of indicators.

In the schematic arrangement shown in Figs. 5 and 6 the transmitting mechanism is indicated at S in Fig. 5. The designation Figs. 1 and 7 on the rectangle indicated by S is for reference to Figs. 1 and 7 in which a suitable form of transmitting mechanism is shown in detail. The rest of the mechanism shown in Figs. 5 and 6 constitutes a receiving mechanism which may be a check board in the transmitting station and is controlled over the lines L1, L2, L3, L4 and L5. As indicated in Fig. 7, other receiving stations may be controlled over lines L'1, L'2, L'3, L'4 and L'5, the various receiving stations being preferably connected in parallel and identical in construction with the receiving mechanism in the transmitting station.

In each receiving station, as shown in Fig. 5, are rotary distributor arms VR1 to VR5 which cooperate with various contacts to control the range selection relays A—RN and AR, and price controlling relays which control the setting-up operation of the indicators of a selected range, such price controlling relays being indicated at B—HP, BR; C—TP, CR; D—UP, DR; and E—FP, ER; the letters H, T, U and F indicating that these relays respectively control the hundreds, tens, units and fractions wheels of the selected range of indicators.

The relays A—RN control the relays AR both of which are shown in detail in Fig. 9, which over lines 1 to 28, as shown and indicated by SEL, Fig. 6, control the energization of the range selection relays W—1 to W—28, no relays being shown for the lines 29, 30 and 31. Relays W—1 to W—28 control the selection of groups of indicator wheels which are respectively indicated by squares to the right of the W—1 to W—28 relays. One of these relays is detailed out in Fig. 8.

The details of the relays B—HP, BR; C—TP, CR; D—UP, DR; and E—FP, ER; above referred to are shown in Fig. 10, and each of the groups of relays BR, CR, DR and ER may selectively establish any one of the eleven circuits which, in Fig. 6, are shown as cables designated H, T, U and F, which respectively energize the balancing relays F indicated at the bottom of Fig. 6 and designated by H—F, T—F, U—F and F—F. These groups of relays are all alike, one of which is shown in detail in Fig. 11, and their function is to control the operation of the actuating magnets DN and DO of the indicators shown diagrammatically in Fig. 8 and detailed mechanically in Fig. 4.

The function of the balancing relays HF, TF, UF and FF is to control the direction and extent of movement of the corresponding indicator wheels so that the indicators will move directly from the old position to the new position in the shortest direction.

As shown in the parent application, the impulses may be transmitted by a keyboard, of the character shown therein, or by a tape transmitting mechanism of the character such as shown therein and in this application.

As shown in Fig. 2, the tape may be perforated in any one or more of five longitudinal columns and these perforations through the sensing mechanism, shown in Fig. 1, may control any one or more of five contacts, I to V, indicated by these characters at the top of Fig. 2, and in Figs. 1, 5 and 7.

As shown in Fig. 2, it is possible by various combinations of perforations to effect 31 different selections all of which may be made use of in this system in selecting ranges of stock. Certain of these, indicated at 1 to 11, may be used to control the setting-up operation of the selected indicators.

As indicated in Figs. 1 and 7, operation of any of the contacts I to V will cause closing of the contact or contacts VI for purposes later referred to.

When the operator is ready to transmit stock information under control of the tape the tape is inserted in a sensing mechanism such as is shown in Fig. 1, after which the tape may be fed forwardly by a pair of sprocket wheels 10 operated by a pawl 11 mounted on armature 12 which is retracted by the magnet DMR and is moved forwardly by a spring 13 to feed the tape as is well understood in this art.

The operator now starts the transmitter by pressing the key TM, Fig. 7, which completes the energizing circuit for the relay Y. The relay Y prepares an energizing circuit at its make contact $y$, for the relay AN which circuit is completed by the closing of any one of the contacts VI. The key TM also prepares a circuit for the magnet DMR which circuit extends over the contact $b1$ of the relay BL, and is adapted to be completed by the constantly rotating interrupter Ub once during each rotation of the interrupter. As the circuit through the magnet DMR is completed the pawl 11, Fig. 1, is retracted and when the circuit through the magnet DMR is interrupted by the interrupter the pawl 11 is moved forwardly by the spring 13 to move the sprocket wheels 10 ahead one step to advance the tape 14 one step. As the first perforations on the tape are advanced into position over the feelers 15, Fig. 1, the feelers are rocked clockwise by springs 16 to close the associated contacts of the contacts I to V and the contact VI as indicated in Fig. 1. There are as many feelers provided as there are columns on the strip, as is obvious.

Closing of the contact VI completes the energizing circuit for the relay AN, Fig. 7, which at its contact $an$ applies battery to line 17 and battery is continued over the closed contacts I to V to the respective lines L1 to L5, (L'1 to L'5), which, as shown in Fig. 5, are connected to distributor arms VR1 to VR5 which in the position shown are in contact with fixed contacts connected to lines A1, A2, A3, A4 and A5 which control the group of selection relays A—RN, shown in detail in Fig. 9, and designated AI to AV. The current from battery across the lines A1 to A5 is continued across the coils of the corresponding relays AI to AV to a common line 18 which extends over the coil of relay Q in Fig. 10 to ground, the function of which will be referred to later. The relays AI to AV at their contacts $a1$, $a2$, $a3$, $a4$ and $a5$ lock to ground over the line 20a and over a contact $t1$ of the unenergized relay T, Fig. 10. The ground applied over the contact $t1$ to line 20a and across the contacts $a1$ to $a5$ completes the energizing circuits for the selection relays ARI to ARV. These relays will pick up in combinations as determined by the columnar position of the controlling perforations in the sensing strip and operate their various contacts indicated in Fig. 9.

As the relays ARI to ARV pick up they connect ground which is normally applied to the line 22a over the coil of relay CL, Fig. 10, across the operated and normal contacts $ar1$ to $ar5$, Fig. 9, to one of the lines 1 to 31 of which only lines 1 to 28 will be considered as indicators for seven stocks of four ranges each are shown in the view in Fig. 6. Ground continues along one of these lines to the corresponding W relay, Fig. 6, detailed out in Fig. 8, and over the coil of this relay to line 23 which on Fig. 10 is connected by a normal closed contact $t2$ of relay T to battery and ground. This causes the relays W and CL to pick up in series over contacts of the AR relays and the contact $t2$ of relay T. As the relay CL picks up it also connects ground over the contacts $clb$, $clc$, $cld$ and $cle$, to lines 22b, 22c, 22d and 22e which extend to the contacts of the BR, CR, DR and ER groups of price controlling relays which control the setting-up operation respectively of the hundreds, tens, units and fractions indicators designated in Fig. 8 as HI, TI, UI and FI.

The operated relay W of which there is one for each range of stock, as shown in Fig. 6, applies ground at its make contacts $hg$, $tg$, $ug$ and $fg$, Fig. 8, to the brushes IN of the hundreds, tens, units and fractions indicator wheels HI, TI, UI and FI. Each of the brushes IN cooperates with eleven fixed contacts numbered 1 to 11, Fig. 8, which correspond respectively to the 1 to 9, 0 and blank positions of rotatable indicator wheels such as are well known in the art. When an indicator is in any of its eleven positions its arm IN makes contact with the associated fixed contact corresponding to the position of the indicator. The lines connected to the fixed contacts are extended over various resistances Ro and contacts of the associated F relays, Fig. 11, to lines 24 and 25, Fig. 11, which control the operation of steering relays RN and RO each of which is shown in Fig. 11 as two separate relays one of each set of which is operated by current over the line 24 and the other by current over the line 25. The indicia 1 to 9, 0 and blank are arranged in a continuous unbroken circular series on the indicator wheel, the same arrangement that is now used in practice and is well known in the art. The contacts 1 to 11, Fig. 8, which correspond to the indicia 1 to 9, 0 and blank are also arranged in a continuous unbroken circular series. For the purposes of illustration these contacts have been shown in the diagram in Fig. 8 as arranged in a semi-circle.

The W relay also connects the DO and DN operating magnets for the indicators of the selected group to lines N and O which in Fig. 11 are adapted to be connected over contacts rn and ro of the steering relays RN and RO controlled by the associated F relays to line 26 which is connected over a break contact p of the relay P to line 27 which, on Fig. 10, is connected across an operated contact clp of relay CL and line 28 and the coil of relay T to the interrupter UBR. The interrupter UBR is a constantly rotating interupter and is preferably synchronized with the interrupter Ub in the transmitter shown in Fig. 7. As the interrupter UBR rotates it connects ground to the lines 28 and 27 and over the contacts p of relays P to the lines 26 of the relays RN and RO controlling the operation of the various indicator magnets DN and DO.

As shown in Fig. 6, there is one group of relays HF common to all the hundreds indicator wheels, another group TF common to all the tens indicator wheels, another group UF common to all the units indicator wheels, and another group FF common to all the fractions indicator wheels. The relay W, as shown in Fig. 8, connects the energizing circuits of the magnets DN and DO of the hundreds indicator HI, across the contacts whn and who, to the lines N and O leading to the contacts rn and ro of the RN and RO relays associated with the group of F relays for the hundreds indicators. Similarly, the relay W connects the DO and DN magnets for the tens indicators, units indicators and fractions indicators over contacts wtn, wto; wun, wuo; and wfn, wfo to the lines N and O which lead respectively to the contacts nr and or of the relays RN and RO controlled by the F relays associated with the tens, units and fractions indicators.

The relay Q, Fig. 10, as before stated, was operated in series with the operated relay of the group AI to AV, Fig. 9. As it was operated it applied ground over its contact q to line 30 which is extended over the distributor arm VR6 and over the line connecting the first, third, fourth, fifth and sixth contacts of the distributor to one terminal of the magnet DVR to the other terminal of which battery is applied. The magnet DVR is the operating magnet for the distributor arms VR1 to VR5, Fig. 5, and the distributor arm VR6, Fig. 10, and causes these arms to move forward, after the circuit of the magnet DVR is broken at the contact q upon deenergization of the relay Q which occurs as the tape is stepped forward upon deenergization of the stepping magnet DMR, Figs. 7 and 1. The magnet DMR is energized and deenergized once during each rotation of the interrupter Ub, Fig. 7. As the tape is stepped forward it opens the circuit through the first coil of each of the energized relays AI to AV and the coil of the Q relay, Fig. 10, which latter in turn opens the circuit of the operating magnet DVR, permitting mechanism of the type shown in Fig. 1 to step the distributor arms VR1 to VR5 ahead one step.

As shown in Fig. 5 the distributor arm VR1 in its second position makes contact with the fixed contact which is connected by a line 31 to the line 18 which, as stated before, is the battery lead for the relay Q. The other distributor arms VR2 to VR5 do not make contact with any fixed contacts in the second position. As the relay Q picks up it connects ground over its contact q to line 30 which continues over the distributor arm VR6 and the second contact of the distributor arm to line 32 and across a normal make and break contact t3 of the unenergized relay T to line 33 which is connected to the line connecting the other stationary contacts of the distributor VR6 which is the ground for the operating magnet DVR. This causes energization of the magnet DVR and forward stepping movement of all the distributor arms VR1 to VR6 after deenergization of the magnet due to the stepping movement of the tape so that the distributor arms will make contact with the third of the associated fixed contacts.

The tape has been stepped up ahead so that a third series of perforations control the sensing members 15, Fig. 1, to control the various contacts I to V and the contact VI to apply battery to the various lines L1 to L5. As the distributor arms VR1 to VR5 are in the third position battery is continued over the lines B1 to B5 which, as indicated in Fig. 5, extend to the group B—HP relays detailed out in Fig. 10 and indicated respectively as BI to BV. The lines B1 to B5 extend around the coils of relays BI to BV and are connected to the line 18 which is the energizing lead of relay Q. This causes the relays BI to BV and the relay Q to pick up in series in the same manner in which relays AI to AV and Q picked up as selection of a range of indicators was effected. As the relays BI to BV pick up they close their contacts b1 to b5, and complete a holding circuit from battery over the second coil of each energized relay and the contacts b1 to b5 and lies 20b and 22b and a contact clb of relay CL to ground. At the same time, battery is extended from the corresponding relays BRI to BRV and across the contacts b1 to b5 to line 20b causing the relays BRI to BRV to lock over the line 20b and contact clb. As the relays BRI to BRV pick up they connect ground applied over the contact clb of the relay CL to the line 22b which is continued across the operated and normal contacts br1, br2, br3, br4 and br5 of relays BRI to BRV to one of the eleven lines indicated by 1 to 11 at the right in Fig. 10 which, as shown in Figs. 6 and 11, are the ground leads for the relays F1 to F11 associated with the hundreds indicator wheel HI. This causes one of the relays F1 to F11 corresponding to the numerical value of the new setting of the hundreds indicator to pick up. As one of the relays F1 to F11 picks up it breaks the series connection between the various resistances Ro1 to Ro11 at its contacts f1 to f11 and connects the associated line from the hundreds indicator in Fig. 8 to the ground lines of the relay P. Relay F also connects various of the lines coming from Fig. 8 across its contact f24 to the line 24 and across its contact f25 to the line 25. If we assume that the set-up on the hundreds indicator is 8, and that the new set-up is to be 4, then ground extended over the contact hg of relay W, Fig. 8, is extended over the arm IN and over the line 8, Fig. 8, to the line 8, Fig. 11, across four resistances Ro8 to Ro11 to the line 34 connected across the contact f1 of relay F1 to line 35 which is connected across the contact f25 of relay F4 to line 25 which is the ground lead for one coil of each of the steering relays RN and RO. Ground on line 8 is also continued across resistance Ro7 and the contact f7a of relay F7, to line 36 which is connected across the contact f24 of relay F4 to line 24 which is the ground line for the other coils of the steering relays RN and RO. As the resistance in the circuit 24 is smaller than the resistance in the circuit 25 the relays RN and RO will be controlled in such a manner that the contact ro will remain in the position indicated, and the contact rn will connect the line 26 to the N line. The line 26, as stated before, is connected across the contact p of the relay P to the line 27 connected across the contact clp of the relay CL to the line 28, which is connected over the coil of relay T, Fig. 10, and is adapted to be grounded by the interrupter UBR once between each rotation of the interrupter. As the interrupter applies ground to this circuit ground is extended over the contact rn to the line N, Fig. 11, which in Fig. 8 is shown as extended across the contacts whn of the relay W and across the coil of the magnet DN of the hundreds indicator HI to the ground line of a second coil of relay W the energizing lead of which is connected across the resistance Wi to battery and ground. The relays W, DN and T pick up in series whenever the interrupter UBR applies ground to the coil of relay T. This causes the magnet DN to attract pawl 38 to move the indicator HI in a clockwise direction from the position 8 toward the position 4, as is well understood. As the relay T, Fig. 10, picks up it disconnects battery at its contact t2 from the line 23 so that the relay W will be held up over the new circuit established to energize the magnet DN. Both the relays W and T are slow releasing so that they remain energized as long as impulses continue. The resistance Wi prevents energization of another W relay as long as any W relay is energized.

With the indicator arm IN in the next position in contact with the seventh fixed contact, the number of resistances in the lines 24 and 25 is changed, but the number of resistances in the line 24 will remain smaller than the number in line 25 causing the magnet DN to be energized successively until the indicator arm IN reaches the new position of adjustment, that is, engages the contact 4. When the indicator engages the contact 4 ground will be applied to the line 4 leaving Fig. 8 and entering Fig. 11 and as the relay F4, Fig. 11, is energized under control of the BRI to BRV relays, ground will continue across the contact f4 to the line 49 which is the ground line for the relay P. As the relay P picks up it opens the circuit for the magnet DN at its contact p thus preventing further backward movement of the indicator HI. The indicator HI has been moved directly from the eighth position to the fourth position by the shortest possible movement.

As the tape is being moved forward, the groups of relays C—TP, CR; D—UP, DR; and E—FP, ER which respectively control the tens price, the units price and the fractions price, are energized to control in conjunction with the indicator brushes or arms IN of the tens, units and fractions indicators their respective F relays to control the operation of their respective DN and DO magnets so that all the indicators in which a new setting-up operation is required are adjusted substantially simultaneously. The magnet DO operates the indicator forwardly by actuation of the pawl 38' as is well understood. As the various indicators are moved into a new set-up position their associated P relays are energized and operate their contacts p to open the various branches of the circuit to the line 27, Fig. 10, which after the relay T was energized was connected over the contact t27 to the line 28 to maintain the relay T energized as long as impulses are sent to the various indicator wheels, irrespective of the contact clp which initially connected the line 27 to the line 28. After all the p contacts are open no further impulses will be sent out over the interrupter UBR and accordingly the relay T will deenergize and as it deenergizes it removes ground over its contacts tb, tc, td and te, from the circuits to and over the groups of relays B, C, D and E causing the various relays B, C, D and E, and relays F to release.

*Method of operation of the system described*

It is assumed that the range to be selected is the number 4 range which is the last range of the first stock on the board, and that the indication on this range is 842.6 and that the new price to be set-up is 785.3. A strip perforated to select range 4 and to transmit the new price 785.3 is illustrated in Fig. 3.

The operator closes the switch TM, Fig. 7, which closes the circuit for relay Y. The circuit is as follows:

Ground, switch TM, winding of Y, negative pole, ground.

At the same time the circuit for the paper feeding magnet DMR is closed, which is as follows:

Ground, sender TM, interrupter Ub, contact b1, winding of DMR, negative pole, ground.

The stepping magnet DMR, Figs. 1 and 7, actuates the tape feeding wheel 19 which moves the tape ahead one step. As the first line of perforations slides over the sensing members 15 the latter close the contact III and the contact VI. The latter contact completes a circuit from ground across contact VI, across contact y, and winding of AN to battery. The relay AN attracts its armature an and closes the following circuit:

Ground, battery, contact an, contact III, line L3, distributor arm VR3, Fig. 5, contact A3, one of the windings of relay AIII, Fig. 9, of the selecting group of relays, and across the line 18 and the coil of relay Q, Fig. 10, to ground.

The relays AIII and Q are then energized and close the following circuits:

(a) Ground, contact t1, line 20a, contact a3, one of the windings of relay AIII to battery and ground, and also the winding of relay ARIII to battery and ground.

(b) Ground, contact q of relay Q, distributor VR6, contact 1, winding of the magnet DVR, to battery and ground.

The magnet DVR causes the distributor arms VR1 to VR6 to move forward one step so that the distributor arms are now in the second position.

The paper will be fed forwardly upon deenergization of the electromagnet DMR and the next following perforation in the strip will control the closing of the I and VI contacts so that the following circuit will be made:

Ground, battery, contacts an, contact I, line

L1, distributor VR1, contact 2, line 31, line 18, and winding of the relay Q to ground.

Relay Q attracts its armature which releases again as the tape is stepped forward. The electromagnet DVR is then actuated by a circuit from ground across contact q, line 30, distributor arm VR6, line 32, contact t3 of relay T, line 33, coil of the magnet DVR to battery and ground. The magnet DVR receives an impulse and moves the distributor arms ahead one step. The arms of the distributors are now in contact with the third contacts.

Each time impulses are transmitted under control of the tape over the lines L1 to L5 the magnet DVR is energized under control of the relay Q which attracts its contact q, which again releases as soon as the current is interrupted in the transmitter, thereby permitting the distributors to be moved ahead one step. The function of the distributor is to distribute the impulses transmitted under control of the paper to the groups of relays A, B, C, D and E over which they may control respectively the selection of the range of stock and the new setting-up operation of the hundreds, tens, units and fractions indicator wheels.

As described above, after the first set of perforations have been sensed the relays AIII and ARIII are held up over the contact t1 of the relay T, Fig. 10.

Relay ARIII attracts its contacts ar3 and closes the selector circuit, which is as follows:

Positive pole, winding of the relay CL, line 22a, contact ar1, contact ar2, operated contact ar3, contact ar4, contact ar5, line 4, one of the windings of the selecting relay W—4 which may be taken as the relay shown in Fig. 8, line 23, and over the contact t2 to battery and ground.

The relay W—4 is energized and connects all of the DN and DO relays of this range to the N and O lines and connects all of the indicator arms to ground. The relay CL picks up in series with the relay W and prepares the circuits for actuating the groups of F relays. The operation for selection will then be completed.

The actuation of the first or hundreds indicator HI, Fig. 8, will be effected in the following manner:

As soon as the perforations corresponding to the digit 7 are fed over the feelers 15 the contacts III, IV, V and VI will be closed. The following circuits will be made:

(a) Ground, battery, contact an, contact III, line L3, distributor VR3, contact 3, line B3, winding BIII, Fig. 10, and winding Q to ground.

(b) Ground, battery, contact an, contact IV, line L4, distributor VR4, contact 3, line B4, winding BIV, and winding Q to ground.

(c) Ground, battery, contact an, contact V, line L5, distributor VRV, contact 3, line B5 winding BV, and winding Q to ground.

Relay Q receives an impulse and as stated before completes a circuit for the operating magnet DVR, the latter causing all of the distributor arms to be moved ahead one step to contacts 4.

The distributor arms are now in contact with the fourth sets of contacts and the relays BIII, BIV and BV were energized and their armatures b3, b4 and b5 are attracted. These relays remain energized over the following circuits:

(a) Ground, contact clb, line 22b, line 20b contact b3, and winding BIII to battery and ground.

(b) Ground, contact clb, line 22b, line 20b, contact b4, and winding BIV to battery and ground.

(c) From ground contact clb, line 22b, line 20b, contact b5, and winding BV to battery and ground.

At the same time the circuits of the relays BRIII, BRIV and BRV will be closed by the relays BIII, BIV, and BV over the operated contacts b3, b4 and b5 and the contact clb of the relay CL.

The relays BRIII, BRIV, BRV attract their contacts and close the following circuit:

Ground, contact clb, line 22b, normal contact br1, normal contact br2, operated contact br3, operated contact br4, and operated contact br5, across the line 7 (Fig. 10) to line 7 (Fig. 11) and across the coil of the relay F7 to battery and ground.

The lines 1 to 11 of the BR relays are the lines over which circuits are made to control the energization of the F relays associated with the hundred indicators.

As the hundreds indicator is in position to exhibit the numeral 8 the line 8 extending from this indicator, Fig. 8, is connected over the indicator arm IN and the contact hg of relay W to ground.

As the relay F7, Fig. 11, has been energized under control of the B relays the series of resistances Ro are broken at the contact f7 and ground on the line 8 is connected across two resistances Ro8 and Ro9 and the line 42, and across the contact f24 of relay F7 to the line 24. Ground on the line 8 is also connected across four resistances Ro8 to Ro11 at the right of Fig. 11, across line 34, contact f1 of relay F1, line 35, and across three resistances Ro1 to Ro3 and line 41, and across the contact f25 of relay F7, to line 25. As there are more resistances in the circuit 25 than in the circuit 24 the contact rn will close and the contact ro will remain open so that the circuit for the relay DN of the hundreds indicator will be closed. This circuit will be as follows:

From ground across interrupter UBR, winding of the relay T, contact clp, line 27, contact p, contact rn, contact whn, coil of the relay DN, a second winding of the relay W, resistances Wi to battery and ground.

The electromagnet DN receives an impulse and moves the indicator IN backward one step. Ground is then connected by means of the contact hg to the line 7 so that the following circuit is closed:

From ground indicator arm IN, contact 7, line 7, contact f7, line 40, coil of relay P to battery and ground.

The relay P attracts its contact p and interrupts the circuit for the operating magnet DN so that the hundreds indicator will remain in the position 7.

As the circuit for the magnet DN is made across the relay T this relay will be energized and at the contact t1 interrupts the holding circuits for the relays AIII and ARIII which release their contacts thereby opening by means of the relay ARIII the circuit for the relays CL and W—4 so that the winding of the relay CL and the first winding of the relay W—4 will become currentless.

The relay T holds the various circuits described closed even though the contacts of the relay CL remain interrupted. The relays T and W remain attracted until the time when the exploring relays P corresponding to the hundreds, tens, units and fractions indicator wheels are energized, which is at the time that all four indicators have arrived in their new position.

As before referred to, the first series of perforations in the tape control the selection of the fourth range by controlling the energization of the relay W—4. The next set of perforations control the stepping ahead of the distributor arms, Fig. 5. The next set control the energization of the various B relays which, together with the arm IN of the hundreds indicator, control the F relays associated with the hundreds indicators to in turn control the direction and extent of movement of the hundreds indicator from the old to the new position.

The fourth set of perforations control the various C relays to control the tens indicator in a similar manner to cause the tens indicator to move forwardly from 4 to 8. This movement of the indicator is controlled from the circuits controlled by the C relays which control the F relays associated with the tens indicator, and through the circuits made across the tens indicator in the fourth position and in the fifth, sixth and seventh positions as it is moved forward to the new position to indicate 8. Ground on line 4 over resistances Ro3, Ro2, Ro1 and Ro11 to line 24 and over resistance Ro4 to line 25 causes energization of magnet DO of the tens indicator causing this indicator to move to the "5" position. Then ground on line 5 causes the indicator to move to the "6" position, ground on line 6 causes the indicator to move to the "7" position, ground on line 7 causes the indicator to move to the "8" position, and ground on line 8 causes opening of the circuit for the magnet DO.

The fifth set of perforations similarly control the various D relays which control the F relays associated with the units indicator wheels over the contacts of which circuits are made from the units indicator to control by energization of magnet DO the forward movement of the units indicator from 2 to 5, and to terminate this movement by interrupting the circuit of DO when the new set-up 5 has been reached. As the old set-up on this indicator was 2 and the new set-up is 5 the indicator will move forwardly three steps.

The last set of perforations will control relays E which in turn cause the relays F associated with the fractions indicators to pick up and to control the resistances associated with the F group so that ground applied over line 6 will cause the magnet DN associated with the fractions indicator to step the indicator backwardly until the indicator arm IN is in contact with the line 3, at which time the relay P associated with the relays F will be energized and will break the circuit to the magnet DN.

As soon as all the indicators have been moved to the new position and all the relays P have been energized the relay T will be again deenergized. As the relay T deenergizes all of the relays in the system will be deenergized and the parts will assume the position shown on the drawings.

If, after the transmission of the assumed stock information has been made and before the indicators have been set, a transmission is made of information in reference to another stock, that is, when the relays T and W—4 are still energized, the relays AI to AV may be energized together with the relays ARI to ARV and may be held over a contact rs of relay RS, Fig. 10, which is energized from battery over line 45, normal contact cl1 of relay CL and contact t1 of relay T to ground. The relays CL and W cannot pick up as long as a W relay is energized. The distributors will move to contact 2 and as the "gap" is transmitted, the relay Q will apply ground over contact q to lines 30 and 32 continued over contact t3 to line 46 causing the relay X to pick up. Relay X picks up and at its contact x1 closes a holding circuit for relay X over contact t3.

Relay X at its contact x2 applies ground to line 47 which causes the BL relay, Fig. 7, to pick up and open the circuit for magnet DMR to discontinue feeding of the strip and closes at b2 the circuit for the signal lamp KL.

The tape feeding mechanism is held until the relay T descends after all of the indicators have been adjusted. The relay W—4 releases and the CL and newly selected relay W pick up in series. With T released and CL picked up, relay RS releases. Release of relay T opens the circuit for relay X which closes the circuit for magnet DMR and opens the circuit for the relay BL. The transmission will be continued and the operation will be the same as usual.

The balancing relays F, Fig. 11, control the indicator operating magnets DN and DO, Fig. 8, to move the indicators backwardly and forwardly directly from the old set-up to the new set-up through the shortest distance.

The relays F control the indicator operating magnets to move the indicator from the nine position to the one position through the shortest possible distance, that is, from 9 to 10, 10 to 11, and 11 to 1, under control of the following circuits: The operation of the selecting relay W applies ground to the indicator brush IN which, when the indicator is in the ninth position, is extended across the contact 9 and over the line 9 in Fig. 11 coming from Fig. 8 and over various resistances and contacts, depending upon which of the relays F is energized, over lines 24 and 25 to one terminal of the relays RO and RN.

If the indicator is to be moved to exhibit the numeral one, the relays in Fig. 10 will be operated to apply ground to the outgoing line 1 which in Fig. 11 causes the relay F1 to pull up.

The circuit for the relays RO and RN for closing the circuit over line N for the indicator operating magnet DN, Fig. 8, may be traced in Fig. 11 over line 24, contact f24 of relay F1, line 41, contact f4a, resistance Ro4, etc., resistance Ro8, contact f9, to ground on line 9 coming from Fig. 8. This circuit includes five resistances Ro4 to Ro8.

The circuit for the relays RO and RN for closing the circuit over line O for the indicator operating magnet DO may be traced on Fig. 11 over line 25, contact f25 of relay F1, directly to line 9 coming from Fig. 8. This circuit does not include any resistances so that the effect will be to close the circuit across the line O energizing the magnet DO and operating the indicator forwardly to position 10 which corresponds to O.

The circuits over lines 24 and 25 will be the same as before, each including additionally the resistance Ro9. The effect will be to move the indicator from the zero position to the blank position so that the brush IN will engage the contact 11.

The circuits over lines 24 and 25 now include, in addition, the resistance Ro10. The effect will be to move the indicator from the blank or 11 position to the 1 position by operation of the magnet DO.

When the brush IN is on contact 1, ground over the contact f1 of relay F1 and over the line 40 will energize the relay P which at its contact p removes ground from the line 26 and, consequently, prevents ground from being applied to the lines O and N.

The indicator will be moved directly from the 1 to the 9 position by moving across the blank or 11 position and the 10 or zero position under control of the following circuits: When the indicator stands at one, line 1 from Fig. 8 will be grounded and when the new set-up is to be 9 relay F9 will be energized. The circuit of the relays RO and RN over the line 24 is made across the contact f24 of relay F9, line 35 and line 1 to ground in Fig. 8. The circuit for the relays RO and RN over line 25 will be made across the contact f25 of relay F9, contact f6, resistance Ro5, etc., contact f2, resistance Ro1, contact f1a and line 1, to ground. The effect of these circuits will be to cause the circuit over the line N to be closed causing the indicator operating magnet DN to move the indicator in the reverse direction so that the brush IN will move from contact 1 to contact 11.

When the brush IN is on contact 11 circuits 24 and 25 include in addition the resistance Ro11. This causes the operating magnet DN to move the indicator brush IN to the contact 10. On contact 10 the circuits 24 and 25 include in addition the resistance Ro10 causing the operating magnet DN to again operate and move the indicator brush IN to the contact 9. With the brush IN in this position ground over the line 9, contact f9 of relay F9, and line 40 will operate the relay P, removing ground from line 26 as before.

Under control of the system of relays and resistances shown in Fig. 11, the indicators will always be moved directly from the old set-up to the new set-up position in the shortest direction, thus saving time in the setting up of the new price which is one of the important features of my invention.

Second embodiment

The second embodiment of an electric long distance indicating system comprises a check board in the transmitting station substantially of the same construction as that shown in Figs. 1 to 11 except for the construction of the F relays which has been changed so as to control the energization of additional relays NR, OR, A, B, C, D and E, Fig. 12. The construction is such that the old setting on the selected indicators on the check board in conjunction with the impulses representing the new set-up control the relays NR and OR to control the direction of movement of the indicators on the check board, the latter relay OR also controlling the forward movement of selected indicators on the distant board, and to control the relays A, B, C, D and E to transmit impulses to determine the number of steps of forward or backward movement of the selected indicators on the distant board.

As shown in Figs. 14 and 15 the wiring diagram for the distant station of the modification shown in Figs. 12 to 19 is somewhat similar to that shown in Figs. 5 and 6 of the modification shown in Figs. 1 to 11 except that the F relays are omitted and certain other relays, such as PU, ZR, PH, P, SL, AZ, BZ, DZ and EZ are added for purposes referred to later.

The contacts I to V and VI, Fig. 12, may be controlled by a tape mechanism such as shown in Fig. 1 or any type of key mechanism. Operation of the tape transmitting mechanism is started by closing the switch TM which causes the relay Y to pick up. As the relay Y picks up it extends the circuit for the relay AN from battery over the coil of relay AN, contact y of relay Y, to the contacts VI, which will be continued across these contacts to ground when these contacts are closed. As one of the contacts I to V is closed relay AN also applies battery over its contact an to the line 17 which is connected to the contacts I to V. As the interrupter Ub rotates it completes the circuit for the tape operating magnet DMR over contact b1 of the relay BL. As the magnet DMR is energized it retracts the operating pawl 11, shown in Fig. 1, which upon deenergization of the magnet DMR is moved forward by the spring 13 to feed the tape 14, as before described. As the sensing members 15 are raised through the perforations in the tape, battery over the contact an, line 17, is extended over lines L1 to L5 to distributors VR1 to VR5, Fig. 5, causing the A—RN and the AR relays to pick up and to operate one of the relays W to effect selection of a range of indicators. As one of the relays A—RN is energized the relay Q picks up and causes the magnet for the distributor arms VR1 to VR5 to operate and upon release of relay Q and the operating magnet the distributor arms will be moved forward.

The magnet DMR, Fig. 12, will be deenergized by the interrupter Ub, and the tape will be stepped forward and the control over the hundreds, tens, units and fractions indicators will be made in the same manner as described in connection with Figs. 1 to 11.

As the transmission is made to the groups of relays A—RN in the check board the relays AK to EK, Fig. 12, are energized and close circuits to the lines L'1 to L'5 over their contacts ak to ek. These circuits start from battery and continue over contact an2 of relay AN to line 50 which is connected to all the collector arms wo1 to wo5 and, if it is assumed that it is desired to select the range 4 and that the indicators of this range show 842.6, and that it is desired to change this setting to 785.3, then battery on the line 50 will be continued across the line 51 and the contact ck of relay CK which was energized under control of the contact III, to line 52, across the collector arm wo3' to line L'3 which extends to the collector arm DVR3, Fig. 14, which is in contact with the first contact. This causes the relay AIII of the group A—RN to pick up which in turn causes the energization of the relay ARIII which through line 4 of the lines 1 to 31 causes the W—4 of the W relays, Fig. 15, to pick up and to effect selection of the range 4 group of indicators in the same manner as in the modification in Figs. 1 to 11. The group of relays A—RN is detailed out in Fig. 17 and the lines extending from the distributor arms DVR1 to DVR5 to the energizing leads for these relays, are shown in Figs. 16 and 17. The lines extending from the distributor arms to the group B relays detailed out in Fig. 18 are also shown in Figs. 16 and 17. Fig. 16 also shows the lines extending from the distributor to the groups of relays C, D and E for the tens, units and fractions indicators. As the relays in groups A, B, C, D and E are energized the relay Q in Fig. 16 is energized to complete a circuit for the magnet DVR in the same manner in which this was done in connection with the modification in Figs. 1 to 11.

As the second impulse is sent out under control of the tape, Fig. 3, battery is applied to line L1 and to line L'1 to operate the Q relays in the check board and in the distant station which will cause the distributors in the check board and in the distant station to move ahead one step as in the case of the modification described in Figs. 1 to 11. As shown in Fig. 12, the first and second contacts of the distributor arms wo1 and wo1' associated with the L'1 lines are in electrical connection with the circuit made by the contact ak of the relay AK. As the relay AK picks up under control of the second perforation, shown in Fig. 3, the relay Q in the distant station will pick up and close a circuit for the magnet DVR which moves the distributor arms DVR1 to DVR6 ahead one step into contact with the third fixed contact.

The operation of the check board and the distant board in so far as the selection of range of stock is concerned is exactly the same as that shown in Figs. 1 to 11 except that the range selection and the gap control in the distant station are effected over the relays AK to EK instead of directly from the contacts I to V.

As the third series of perforations, Fig. 3, are moved under the sensing members 15, contacts III, IV and V will be closed and while they cause the relays CK, DK and EK to pick up these relays will not close any circuits over the lines L'3, L'4 and L'5 for the reasons already stated. No circuits are, therefore, directly made over the contacts I to V to the distant station for controlling any of the B (I to V), C (I to V), D (I to V), and E (I to V) relays. The circuits made by the contacts III, IV and V will control the B and BR relays in the check board which will operate as in Figs. 1 to 11 to energize the F7 relay, Fig. 13, associated with the hundreds indicator wheel on which the digit 8 is displayed. As the selecting relay W—4 is energized it connects the circuits to the various DN and DO relays and also applies ground to the indicator arms associated with the hundreds, tens, units and fractions indicators, this ground being continued across the hundreds indicator on line 8, Fig. 13, across the resistances Ro8 to Ro11, across the contact f1 of relay F1, line 35 and contact f24 of relay F7, to line 24, and across the resistances Ro8 to Ro11 and Ro1 and across the contact f25 of relay F7, which causes the polarized relays N and O to close the contact n' so that ground from the line 8 over the resistances Ro will be continued across the contact n', line 52, the coil of relay NR, Fig. 12, and the coils of relays A, B, C, D and E to ground. This causes the relay NR and the relay A to pick up, the construction being such that the relay A alone will pick up in series with NR when four resistances ro are in the circuit.

The construction of the relays A, B, C, D and E is such that when there are four resistances in the circuit the relay A alone will be picked up. When there are three resistances in the circuit relays A and B will be picked up, and when there are two resistances in the circuit relays A, B and C wil be picked up, etc.

The contacts associated with the RO and RN relays, Fig. 11, are omitted in this modification and are replaced by contacts nr and or of relays NR and OR, Fig. 12, which connect ground on line 26 extending from the interrupter on line 27 and over contact p of relay P, Fig. 13, across the lines N and O and the contacts of the W relay to the DN and DO magnets of the hundreds indicator and the selecting relay W—4 to battery and ground. As the NR relay is picked up the nr contact will close the circuit of the DN magnet for the hundreds indicator causing the indicator to step backward.

In the assumed problem the indicator wheel is to be stepped back from 8 to 7, the direction of movement of the indicator wheel in the check board being determined by the closing of the contact nr and the number of steps being determined by the BR relays as in Figs. 1 to 11.

The relay A closes a circuit from line 50 across the collector arm WO2, contact a of relay A, break contact e of relay E, to the collector arm WO2' so that battery will be continued on line L'2 to Fig. 14 and from the distributor arm DVR2 to the group of relays D (I to V) in the distant station causing the relay BII, Fig. 18, to pick up.

As the relay BII picks up it closes a holding circuit for itself and for the relay BRII, over its contact b2, line 60, and over a contact clB of relay CL to ground which ground is also made across a contact tb of relay T after this relay has been energized. After the relay T is energized and relay CL is deenergized the holding circuit is maintained over contact tB as in the first modification.

Referring back to Fig. 12, the impulses caused by the first two sets of perforations caused impulses to be sent out over the line L'1 to L'5 through operation of the relays AK to EK. As the relay AN picked up it completed ground over its contact an1 to the circuit for the magnet DWO which through the pawl and ratchet mechanisms shown advanced the WO arms one step. As the tape was fed past the feelers and the circuit established was broken the relay AN released causing the magnet DWO to release. This operation continues as long as there are perforations in the tape.

When the arms of the collector WO were in the third position impulses were transmitted to control the relays B and BR under control of the A, B, C, D, E, NR and OR relays, shown in Fig. 12. As the collector WO is moved into the fourth position impulses over the lines L'1 and L'5 are controlled by the joint control of the fourth set of perforations in the tape and the set-up on the tens indicator wheels of the check board through a series of F relays and relays NR, OR and A, B, C, D, E, associated with the tens groups of indicators in the check board. The impulses going out over the line L'1 to L'5 will control relays C and CR in the distant station corresponding to the relays B and BR, shown on Fig. 18 and in the same manner.

In the fifth position the fifth set of perforations and the units indicators through a group of relays F and associated relays NR, OR and A, B, C, D, E will control impulses over the lines L'1 to L'5 to control the D and DR group of relays in the distant board.

When the tape is in the sixth position the sixth set of perforations will, in conjunction with the fractions indicators in the check board, control the associated F relays to in turn control the associated NR, OR and A, B, C, D and E relays to control impulses sent out over the lines L'1 to L'5 which in the distant station control relays E and ER which in turn control the operation of the fractions indicator of the selected range.

As the first impulse was sent over the lines L'1 to L'5 and the redays A and AR, Fig. 17, were energized the selection relay WO—4, which may be the one indicated in Fig. 19, was energized by a circuit from battery over contact t1 of relay T, Fig. 16, across one coil of relay WO—4 across the operated contact of relay ARIII and the normal contacts of the relays ARI, ARII, ARIII, ARIV, ARV, across the coil of the relay CL, Fig. 16, to ground. The relay CL and WO—4 picked up in series over the contact t1.

As the relay CL, Fig. 16, picks up it applies ground over its contact clB and line 60 which is the locking or holding line for the relays B and BR. Similarly the relay CL applies ground to the holding circuits for the relays C, CR; D, DR; E, ER. These holding lines will also be grounded across contacts tB, tC, tD, tE of the relay T after the relay T is energized.

As the various groups of relays B, C, D and E are controlled they each lock by separate lines first over the contacts of relay CL which was energized at the time that the selection was made and later over the contacts of the relay T.

As the relay CL was energized during the selection operation it applied ground over its contact cbr to line 61 for the B group which was extended to the contacts of the BR group. The relay CL also applied ground over the contacts ccr, cdr and cer to lines extending to the contacts r1 of the CR, DR and ER relays.

As the ground was extended across the lines 61 for the various groups of price control relays BR, CR, DR and ER it continued across the various normal contacts of these groups of relays to lines 63 which are the ground lines for the relays ZR, Fig. 18, of which there is one for each group of relays BR, CR, DR and ER.

Relay CL also applied ground across a contact cbp to the line 62 which is now extended across the contact zr of the relay ZR to the ground terminal of the relay PU. As the relay PU picks up it closes a holding circuit over its own contact pu to the line 62.

The interrupter UBR, Fig. 16, rotates constantly and applies ground over the coil of the relay T to line 64 which is continued across the contact zr1 of relay ZR, contact pu1 of relay PU, across the contact p of relay P, across the coil of the relay PH, to the contact brn which in the assumed example is in its normal position so that ground will be continued on line N which, in Fig. 19, is connected across the contact whn of relay WO—4 and across the coil of relay DN through the resistance Wi to battery and ground. The relay WO—4 will now be held up in this circuit independently of the circuit across t1 of the relay T.

As the interrupter UBR rotates it causes energization of the relay T which as it is a slow to release relay will be held up between impulses and remain energized. The relay T at its contact t4 applies ground from the interrupter to line 64' so that the impulsing circuit is independent of the relay ZR which deenergizes as the relays BR are energized. The relay PH, Fig. 18, and the operating magnet DN, Fig. 9, are energized as each impulse is sent out and the indicator is moved back one step.

As the relay PH, Fig. 18, picks up it applies ground over its contact ph to the ground terminal for the relays SL and AZ causing both of these relays to pick up. The relay AZ at its contact az2 locks to a line 66 which on Fig. 16 is grounded across a contact tb2 of the relay T. Grounds are also provided for the AZ to EZ relays of the groups C, D and E over contacts designated tcz, tdz and tez. The relay AZ will be held up as long as the relay T remains energized.

When the relay PH releases it opens the circuit for the relay SL which at its contact s1 connects the ground lead to the line 67 which is now connected across the contacts az1 of the relay AZ to the ground lead of the relay BZ.

As the second impulse goes out to the indicator magnet DN across the relay PH ground will be applied to the relays SL and BZ causing relay BZ to pick up and to lock across its contact bz2 to the line 66. Relay BZ also at its contact bz1 connects the ground lead of the relay CZ to the line 67.

The next impulse energizes the relay PH. The relay CZ will be energized and locked to the line 66 across its contact cz2 and at its contact cz1 connect the line 67 to the coil of the relay DZ.

When the fourth impulse goes out it energizes the relay PH. The relay DZ will pick up and lock over its contact dz2 to line 66 and connect the terminal of the relay EZ over its contact dz1 to the line 67.

As the fifth impulse causes the relay PH to pick up the relay EZ will pick up and lock over its contact ez2 to the line 66.

The function of the relays AZ to EZ is to successively prepare circuits for the relay P over contacts az, bz, cz, dz and ez to the lines which are adapted to be connected across the relays BR to the ground line 61 which, as stated before, is connected across the contact cbr of the relay CL or the contact tbr of relay T to ground.

In the problem assumed the BRII relay was energized and the relay BRI was not energized as the indicator drum mechanism in the hundreds position is to be moved backwardly from 8 to 7. The ground on line 61 is continued across the normal contact br1, across an operated contact br2, a normal contact br3, a normal contact br4, and a normal contact br5 to line 68 which is adapted to be connected across the contact az of relay AZ to the ground line for the relay P. As the first impulse goes out to the DN magnet for the hundreds indicator the relay AZ is energized and a circuit is completed from the line 61, across the BR relays and across a line 68 and over the coil of the relay P to battery and ground. The relay P is energized and opens its contact p thus breaking the circuit to the magnet DN for the hundreds indicator. The hundreds indicator now has been moved from the old position 8 to the new position 7 and the actuating circuit for the magnet DN has been broken at the contact p of the relay P under control of the AZ relay.

It will be recalled that the impulses controlling the relays B, C, D, and E which in turn control the movement of the hundreds, tens, units and fractions indicator wheels were transmitted successively and that while the hundreds indicator is being adjusted, as described, the tens, units and fractions indicators may also be adjusted over mechanisms which are of the same construction as that shown in Figs. 18 and 19.

In the example assumed, as the old setting of the tens wheel is 4 and the new setting is 8 the relay OR, Fig. 12, associated with the tens indicator wheel in the check board is energized so as to cause a transmission over the line L'1 which in turn causes the relay CRI which corresponds in construction and operation to the relay BRI, Fig. 18, to pick up and to switch the circuit over the PH relay associated with the C group of relays to the O line which is connected across the contact wto of the relay WO—4, Fig. 19, to the DO magnet associated with the tens indicator TI. This causes the tens indicator wheel to advance four steps, and to be arrested upon energization of the P relay associated with the group of C relays under control of the circuit made across the contact dz of the relay DZ and across the operated contacts of each of the relays BRI to BRV. When this circuit is completed the relay P will be energized and the energizing circuit for the DO magnet for the tens indicator wheel will be open at the contact p of the relay P associated with the tens indicator wheel.

The construction of the F relays, shown in Fig. 13, is such that these relays operate in conjunction with the indicator contacts of the check board to energize the relay A, Fig. 12 and activate the line L'2 when one backward step of the indicator is necessary to move it from its old position to its new position. If the indicator should be advanced then in addition to the A relay the OR relay will be picked up so that both lines L'1 and L'2 will be energized and the relays such as BRI and BRII will be energized, the relay BRI connecting the pulsing circuit with the lead O and the DO magnet and the relay BRII preparing a circuit for the P relay which is adapted to be closed by the contact az of the relay AZ after one impulse has been sent to the indicator.

The indicator arms of the selected stock on the check board conjointly with the various perforations on the tape will control their associated NR, OR, A, B, C, D and E relays through the instrumentality of the F relays as indicated in the following table. These relays will control activation of the lines L'1 to L'5 and cause the indicator wheels of the selected range in the distant board to move as indicated in the following table:

| Relays | Lines L'1 to L'5 | Drum moves backward or forward |
| --- | --- | --- |
| A | 2 | 1 step backward. |
| OR, A | 1 and 2 | 1 step forward. |
| A, B | 2 and 3 | 2 steps backward. |
| OR, A and B | 1, 2, and 3 | 2 steps forward. |
| A, B, and C | 2, 3, and 4 | 3 steps backward. |
| OR, A, B, C | 1, 2, 3, 4 | 3 steps forward. |
| A, B, C, D | 2, 3, 4, 5 | 4 steps backward. |
| OR, A, B, C, D | 1, 2, 3, 4, 5 | 4 steps forward. |
| A, B, C, D, E | 3, 4, 5 | 5 steps backward. |
| OR, A, B, C, D, E | 1, 2, 3, 4 | 5 steps forward. |

As indicated in the table above the tens indicator wheel which now shows 2 is moved forward to 5 under control of the relays OR, A, B, and C, and the fractions indicator wheel which now shows 4 is moved backward to 3 under control of the relay A.

After all the indicators in the distant station have been adjusted, all the actuating circuits to the various DN and DO magnets will be interrupted at the contacts p of the relays P, and as no further impulses can go out over these lines the relay T will deenergize and restore all of the mechanism in the receiving station to normal.

While the invention has been described with particularity as to the embodiments disclosed, it is to be understood that various changes and substitutions will be apparent to those skilled in the art and that various features disclosed may be applicable to other electrical systems. It is also to be understood that a larger number of ranges of stock may be selected by providing two or more groups of selection relays controlled over added contacts in the distributor, the added groups of relays selectively controlling the energization of multiple contact relays over which selection lines from one group are multipled as described in the parent application. The principle of the invention herein specifically described is also applicable to single line direct or tone frequency transmission or wireless transmission as stated in the parent application.

What is claimed is:

1. Automatic broker's board apparatus comprising indicators for a plurality of stocks or other items, impulse responsive electromagnetic actuating means for operating each indicator impulsively step by step, means operable over a relatively small number of impulse channels for selecting and actuating any desired indicators to cause the same to post digits representative of the quotations, impulse translating devices whereby relatively small numbers of impulses in coded time relationship arriving over said channels are in part translated into groups of selector operating impulses and in part translated into groups of impulses corresponding in number to the several digits to be posted, and connections whereby such translated impulses effect selection of the desired indicators and actuate the indicators selected impulsively step by step.

2. Automatic broker's board apparatus comprising a plurality of indicating devices for posting the varying quotations of stocks or other items, a relatively small number of impulse channels extending to a distant point for the control of said indicators, a plurality of impulse storage devices acting successively for effectively storing impulses received over said channels, a plurality of local circuit means for energizing said indicators concurrently under the control of said storage means respectively to cause several digits of the desired new quotation to be concurrently posted by the indicators, and means operable automatically at the termination of the operation of said local energizing means for releasing said storage devices to normal condition.

3. An automatic quotation board system comprising receiving apparatus having groups of indicators respectively for displaying the prices of stocks or other items, impulse responsive electromagnetic actuating means for operating said indicators impulsively step by step, means for transmitting to said receiving apparatus quotations comprising item selection signals and permutation code item price signals for selecting and actuating desired indicators to cause the same to post digits representative of the quotations, means in said receiving apparatus responsive to said item selection signals for selecting the desired group of indicators and means responsive to said permutation code item price signals for retransmitting to the selected indicators groups of impulses corresponding in number to the several digits to be posted, and connections whereby the last named groups of impulses actuate the selected indicators impulsively step by step.

4. An automatic quotation board system comprising receiving apparatus having groups of indicators respectively for displaying the prices of stocks or other items, impulse responsive electromagnetic actuating means for operating said indicators impulsively step by step, means for transmitting to said receiving apparatus quotations comprising item selection signals and permutation code item price signals for selecting and actuating desired indicators to cause the same to post digits representative of the quotations, said receiving apparatus having means responsive to said item selection signals for selecting the desired group of indicators and price storage means for receiving and storing said permutation code item price signals, and means controlled by said price storage means for retransmitting to the selected indicators groups of impulses corresponding in number to the several digits to be posted, and connections whereby the last named impulses actuate the selected indicators impulsively step by step.

5. An automatic quotation board system comprising receiving apparatus having groups of indicators respectively for displaying the prices of stocks or other items, impulse responsive electromagnetic actuating means for operating said indicators impulsively step by step, means for transmitting to said receiving apparatus quotations comprising item selection signals and item price signals for selecting and actuating desired indicators to cause the same to post digits representative of the quotations, said receiving apparatus having means responsive to said item selection signals for selecting the desired group of indicators and price storage means for receiving and storing said item price signals, and means including impulse generating means controlled by said price storage means for retransmitting to the selected indicators groups of impulses corresponding in number to the several digits to be posted, and connections whereby the last named impulses actuate the selected indicators impulsively step by step.

6. In a stock quotation system, a transmitter, means in said transmitter for registering digits representative of a stock and the price thereof, a plurality of communication channels extending from the transmitter to a receiver, means in the transmitter for generating a series of impulses equal in number to the registered digits, translating means for directing each impulse to a plurality of said channels, the particular plurality employed for each digit depending on the value of the digit, a plurality of decoding devices in said receiver, one for each impulse transmitted over said channels, means for rendering said devices successively responsive to received impulses to decode and register the same as digits of a quotation, and means for posting the quotation.

7. The combination of a quotation board comprising a plurality of groups of indicators, electromagnetic means for selecting any group and for controlling actuation of the selected group, impulsing means for operating said selected group of indicators under control of said actuation controlling means, a transmitting mechanism for transmitting impulses to the quotation board characteristic of the stock designation and the new price, and means for arresting the operation of said transmitting means to prevent transmission of impulses to control the operation of another group of indicators before the selected group of indicators has been adjusted.

8. The combination of a quotation board comprising a plurality of groups of indicators, electromagnetic means for selecting any group and for controlling actuation of the selected group, impulsing means for operating said selected group of indicators under control of said actuation controlling means, a transmitting mechanism for transmitting impulses to the quotation board characteristic of the stock designation and the new price, means permitting the transmission of selection impulses characteristic of another group of indicators during a setting-up operation of a selected group, and means preventing selection of another group being made prior to the conclusion of the setting-up operation of the selected group.

9. The combination of a quotation board comprising a plurality of groups of indicators, electromagnetic means for selecting any group and for controlling actuation of the selected group, impulsing means for operating said selected group of indicators under control of said actuation controlling means, a transmitting mechanism for transmitting impulses to the quotation board characteristic of the stock designation and the new price, means for setting the transmitting mechanism in operation, means permitting the transmission of selection impulses characteristic of another group of indicators during a setting-up operation of a selected group, means preventing selection of another group being made prior to the conclusion of the setting-up operation of the selected group, and means for effecting selection of a new group of indicators at the conclusion of the setting-up operation of the selected group and for starting the transmitting mechanism to transmit impulses characteristic of the price of the new group.

10. The combination of a rotatable indicator provided with indicia extending substantially around its entire periphery, electromagnetic means for operating the indicator forwardly from any one of its positions, electromagnetic means for operating said indicator reversely from any one of its positions, circuits prepared by said indicator in each of its positions of adjustment, steering relays for selectively establishing circuits to said electromagnetic means, and means responsive to impulses characteristic of the new set-up for extending said circuits over the windings of said steering relays to energize one or the other to establish operating circuits for the corresponding electromagnetic means to move the indicator in the shorter direction into its new set-up position.

11. The combination of a rotatable indicator provided with indicia extending substantially around its entire periphery, electromagnetic means for operating said indicator forwardly or reversely from any one of its positions, steering relays for controlling the direction of movement of said indicator, a plurality of resistances adapted to be connected in various combinations in energizing circuits for said steering relays, a plurality of relays responsive to impulses characteristic of the new set-up for controlling said resistances, a multi-position switch operated by the indicator for preparing circuits to said resistances, and means for energizing one of said plurality of relays for controlling said resistances to cause circuits prepared by said indicator to control said steering relays to cause operation of said electromagnetic means to move the indicator in the shorter direction into its new set-up position.

12. The combination of a rotatable indicator provided with indicia extending substantially around its entire periphery, electromagnetic means for operating said indicator forwardly or reversely from any one of its positions, steering relays for controlling the direction of movement of said indicator, a plurality of resistances in the energizing circuits of said steering relays, and means under control of the indicator and impulses characteristic of the new set-up for cutting resistances into and out of the said circuits to control said steering relays to cause the indicator to move in the shorter direction from the old to the new set-up.

13. The combination of a rotatable indicator provided with indicia extending substantially around its entire periphery, electromagnetic means for operating the indicator forwardly or reversely from any one of its positions, a plurality of balancing resistances, and means under control of said indicator and impulses characteristic of the new set-up for cutting said resistances into indicator operating controlling circuits in combinations to cause the electromagnetic means to operate said indicator in the shorter direction from the old to the new set-up.

14. The combination of a rotatable indicator provided with indicia extending substantially around its entire periphery, electromagnetic means for operating the indicator forwardly or reversely from any one of its positions, steering relays for controlling the direction of movement of the indicator, controlling relays responsive to impulses characteristic of the new set-up, circuits established under control of the controlling relays and the indicator for controlling said steering relays, and a circuit prepared by an operated controlling relay for causing the operation of the indicator to discontinue as the indicator moves into its new set-up position.

15. In a transmitting station the combination of transmitting means for sending impulses characteristic of indicator group selection and of the new price, a check board comprising a plurality of groups of indicators, a distant receiving station including a quotation board comprising a plurality of groups of indicators, means for simultaneously effecting selection of the corresponding groups in the check and quotation boards, means associated with the check board adapted to be controlled by the selected group of indicators in the check board and by impulses characteristic of the new price to cause the selected group of indicators in the check board to move directly from the old position to the new set-up position, means also associated with the check board adapted to be controlled by the selected group of indicators in the check board and the impulses transmitted to the check board to determine the angle and direction of rotation necessary to change the selected group of indicators in the quotation board from the old set-up to the new set-up and to transmit impulses to the quotation board characteristic of the angle and direction of movement, and means associated with the quotation board responsive to such impulses for controlling the direction and extent of movement of the selected group of indicators in the quotation board.

16. The combination of a receiving station including means for sending impulses characteristic of indicator group selection and the price, a check board including a plurality of groups of indicators, a quotation board including a plurality of groups of indicators, means under control of the check board and the transmitting means for causing the selected group of indicators of the check board to be moved directly from the old position to the new position, means under control of said last mentioned means for transmitting impulses to the quotation board characteristic of the direction and extent of movement necessary to change the selected group of indicators from the old position to the new position, and means associated with the quotation board responsive to said impulses for causing the selected group of indicators to move directly from the old position to the new position.

17. The combination in a transmitting station of means for creating impulses characteristic of the designation and the new price, a distant station including a plurality of groups of indicators, means for selecting any group, means for actuating the selected group forwardly or reversely, and means in the transmitting station for automatically determining under control of the old price and impulses characteristic of the new price and for transmitting to the distant station impulses characteristic of the direction and extent of movement necessary to move the selected group of indicators to the new set-up position.

18. The combination of a transmitting station including a check board comprising a plurality of groups of indicators, a distant station comprising a plurality of groups of indicators, means in the transmitting station for sending impulses directly to the check board and to the distant station to effect selection of corresponding groups of indicators, means in the transmitting station for sending impulses to the check board characteristic of the new price, and means under control of the check board and the impulses characteristic of the new price for transmitting impulses to the distant station characteristic of the angle and direction of rotation necessary to change the selected group from the old price to the new price.

19. The combination of a transmitting station including a check board, a receiving station including a quotation board, each board including a plurality of groups of indicators and means for selecting any group and actuating the same, transmitting means in the transmitting station for sending impulses to the check and quotation boards to effect selection of corresponding groups of indicators, means in the transmitting station for successively sending sets of simultaneous impulses characteristic of the new price digits to the selected group of indicators in the check board, and means operable under control of the selected group of indicators in the check board and the price impulses for successively transmitting sets of simultaneous impulses to the selected group of indicators on the quotation board characteristic of the direction and extent of rotation necessary to effect the new set-up.

20. In an electrical indicating system the combination of a rotatable indicator provided with indicia extending substantially around its entire periphery, electromagnetic means responsive to a series of impulses for rotating said indicator forwardly step by step, electromagnetic means also responsive to a series of impulses for rotating said indicator reversely step by step, and means under control of the indicator and of signals characteristic of a new set-up for selectively controlling the transmission of a series of impulses to said electromagnetic means to operate said indicator in the shorter direction from any old to any new set-up.

HANS ROBERT SCHEIDEGGER.